United States Patent
Jin et al.

(10) Patent No.: US 11,314,804 B2
(45) Date of Patent: *Apr. 26, 2022

(54) INFORMATION SEARCH METHOD AND DEVICE AND COMPUTER READABLE RECORDING MEDIUM THEREOF

(71) Applicant: Samsung Electronics Co., Ltd., Suwon-si (KR)

(72) Inventors: Sun-mi Jin, Seoul (KR); Ji-hyeon Kweon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 157 days.

This patent is subject to a terminal disclaimer.

(21) Appl. No.: 16/802,979

(22) Filed: Feb. 27, 2020

(65) Prior Publication Data

US 2020/0201901 A1    Jun. 25, 2020

Related U.S. Application Data

(63) Continuation of application No. 14/105,277, filed on Dec. 13, 2013, now Pat. No. 10,614,120.

(30) Foreign Application Priority Data

Dec. 14, 2012  (KR) .................. 10-2012-0146408

(51) Int. Cl.
*G06F 16/583*  (2019.01)
*G06F 16/248*  (2019.01)
(Continued)

(52) U.S. Cl.
CPC ...... *G06F 16/5854* (2019.01); *G06F 3/04883* (2013.01); *G06F 16/248* (2019.01); *G06F 16/532* (2019.01); *G06F 2203/04808* (2013.01)

(58) Field of Classification Search
CPC ... G06F 16/5854; G06F 16/532; G06F 16/248
(Continued)

(56) References Cited

U.S. PATENT DOCUMENTS

| 7,028,228 B1 * | 4/2006 | Lovy ................ G06F 11/3495 714/47.2 |
| 8,136,028 B1 | 3/2012 | Loeb |

(Continued)

FOREIGN PATENT DOCUMENTS

| CN | 102473304 | 5/2012 |
| CN | 102480565 | 5/2012 |

(Continued)

OTHER PUBLICATIONS

Extended European Search Report dated Oct. 20, 2016 in European Patent Application No. 13197217.6.

(Continued)

*Primary Examiner* — James Trujillo
*Assistant Examiner* — Fariborz Khoshnoodi
(74) *Attorney, Agent, or Firm* — Staas & Halsey LLP

(57) ABSTRACT

An intuitive information search method and device based on a displayed image and a computer readable recording medium thereof. The information search method based on an image displayed on a device includes recognizing a first input indicating a selection related to a plurality of objects included in the image, recognizing a second input indicating a search relationship between the selected plurality of objects, and searching for information based on the first input and the second input; and outputting found information through the device.

19 Claims, 19 Drawing Sheets

(51) Int. Cl.
*G06F 16/532* (2019.01)
*G06F 3/04883* (2022.01)

(58) Field of Classification Search
USPC ............................................. 707/722
See application file for complete search history.

(56) References Cited

U.S. PATENT DOCUMENTS

| | | | |
|---|---|---|---|
| 8,209,628 | B1 | 6/2012 | Davidson |
| 8,515,990 | B2 * | 8/2013 | Lee ................. G06F 16/738 |
| | | | 707/769 |
| 9,208,384 | B2 * | 12/2015 | Conwell ................. G06T 3/00 |
| 2002/0107859 | A1 * | 8/2002 | Tsuyuki ................. G06F 16/10 |
| 2006/0200772 | A1 | 9/2006 | Dhanapal |
| 2006/0253491 | A1 | 11/2006 | Gokturk et al. |
| 2007/0041668 | A1 | 2/2007 | Todaka |
| 2007/0208730 | A1 | 9/2007 | Agichtein et al. |
| 2008/0155409 | A1 * | 6/2008 | Santana ................. G06F 9/453 |
| | | | 715/706 |
| 2008/0184147 | A1 * | 7/2008 | Anderson ............. G06F 3/0482 |
| | | | 715/768 |
| 2008/0279481 | A1 | 11/2008 | Ando |
| 2009/0182733 | A1 | 7/2009 | Itoh |
| 2010/0107136 | A1 | 4/2010 | Fildebrandt |
| 2010/0218228 | A1 | 8/2010 | Walter |
| 2011/0040776 | A1 | 2/2011 | Najm |
| 2011/0047517 | A1 | 2/2011 | Lee et al. |
| 2011/0066627 | A1 * | 3/2011 | Seung ................. G06F 3/04883 |
| | | | 707/758 |
| 2011/0069017 | A1 | 3/2011 | Victor |
| 2011/0134047 | A1 | 6/2011 | Wigdor et al. |
| 2011/0170787 | A1 | 7/2011 | Gum |
| 2011/0196864 | A1 | 8/2011 | Mason |
| 2011/0246506 | A1 * | 10/2011 | Nakano ................. G06Q 10/00 |
| | | | 707/769 |
| 2011/0282855 | A1 * | 11/2011 | Ronen ................. G06F 16/332 |
| | | | 707/706 |
| 2011/0302532 | A1 * | 12/2011 | Missig ................. G06F 3/04842 |
| | | | 715/823 |
| 2012/0030254 | A1 | 2/2012 | Miyazaki |
| 2012/0069005 | A1 | 3/2012 | Seen |
| 2012/0121187 | A1 | 5/2012 | Lee |
| 2012/0294495 | A1 | 11/2012 | Wren et al. |
| 2013/0145348 | A1 * | 6/2013 | Agovic ................. G06F 8/34 |
| | | | 717/120 |
| 2013/0262451 | A1 * | 10/2013 | Ishikawa ............... G06F 16/248 |
| | | | 707/722 |
| 2013/0263055 | A1 * | 10/2013 | Victor ................. G06F 3/04883 |
| | | | 715/835 |
| 2014/0208248 | A1 * | 7/2014 | Davidson .............. G06F 3/0488 |
| | | | 715/766 |

FOREIGN PATENT DOCUMENTS

| | | |
|---|---|---|
| EP | 1710717 | 10/2006 |
| EP | 2455871 | 5/2012 |
| JP | 2011-164949 | 8/2011 |
| RU | 2435212 C2 | 3/2010 |
| WO | 2012/158314 | 11/2012 |
| WO | 2012/158808 | 11/2012 |

OTHER PUBLICATIONS

Russian Office Action dated Sep. 5, 2017 in corresponding Russian Patent Application No. 2015128285.
Japanese Office Action dated Dec. 4, 2017 in Japanese Patent Application No. 2013-245702.
Chinese Office Action dated Dec. 5, 2018 in corresponding Chinese Patent Application No. 201310687717.3.
Chinese Office Action dated Apr. 3, 2018 in Chinese Patent Application No. 201310687717.3.
Chinese Office Action dated Mar. 1, 2019 in corresponding Chinese Patent Application No. 201310687717.3.
Korean Office Action dated Jun. 14, 2019 in Korean Patent Application No. 10-2012-0146408.
International Search Report dated Apr. 7, 2014 issued in International Application No. PCT/KR2013/011469.
U.S. Office Action dated Mar. 8, 2016 in U.S. Appl. No. 14/105,277.
U.S. Office Action dated Sep. 16, 2016 in U.S. Appl. No. 14/105,277.
U.S. Office Action dated May 25, 2017 in U.S. Appl. No. 14/105,277.
U.S. Office Action dated Dec. 26, 2017 in U.S. Appl. No. 14/105,277.
U.S. Advisory Action dated Feb. 27, 2018 in U.S. Appl. No. 14/105,277.
U.S. Office Action dated Jun. 18, 2018 in U.S. Appl. No. 14/105,277.
U.S. Office Action dated Jan. 7, 2019 in U.S. Appl. No. 14/105,277.
U.S. Advisory Action dated Mar. 20, 2019 in U.S. Appl. No. 14/105,277.
U.S. Office Action dated Jun. 20, 2019 in U.S. Appl. No. 14/105,277.
U.S. Notice of Allowance dated Dec. 11, 2019 in U.S. Appl. No. 14/105,277.
U.S. Appl. No. 14/105,277, filed Dec. 13, 2013, Sun-mi Jin, et al., Samsung Electronics Co., Ltd.

* cited by examiner

FIG. 4
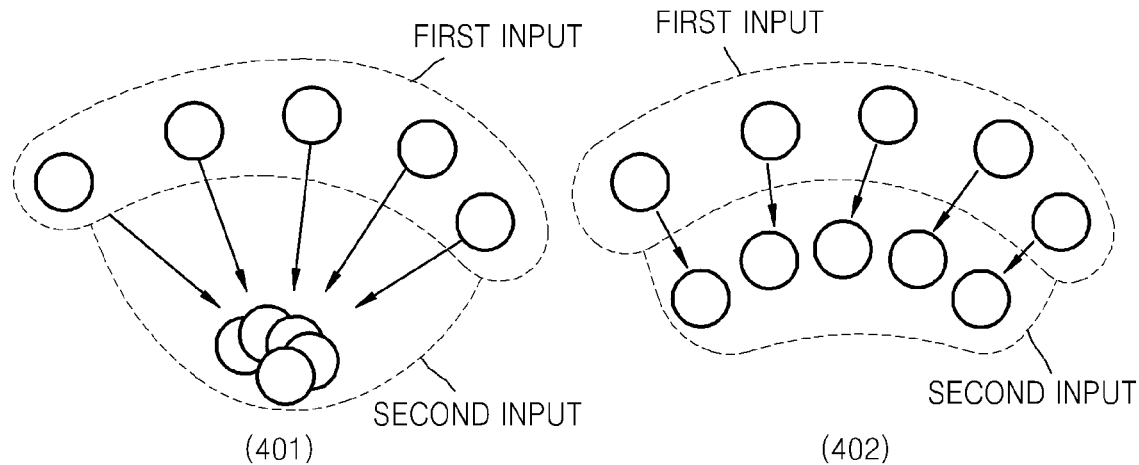
(401)  (402)
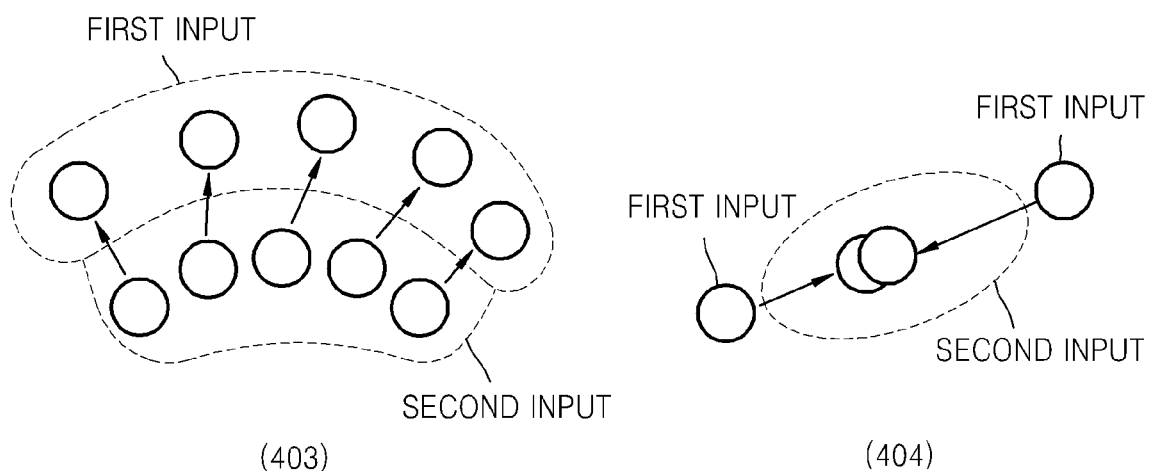
(403)  (404)
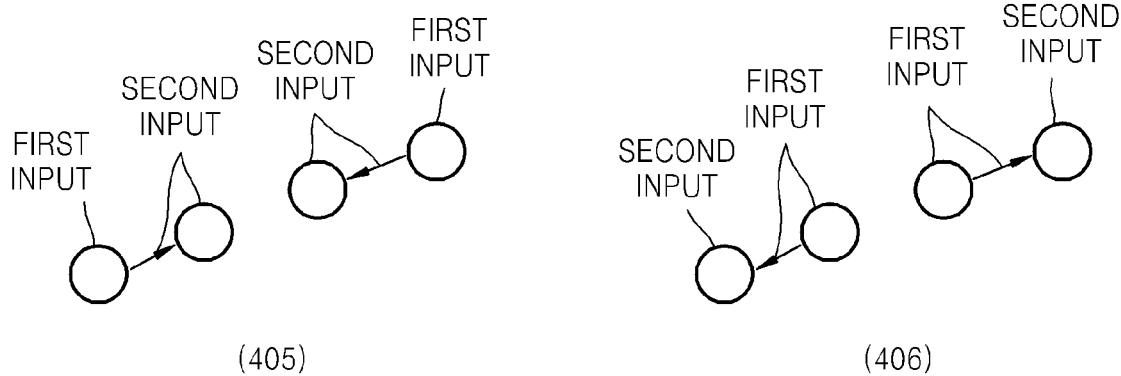
(405)  (406)

FIG. 5
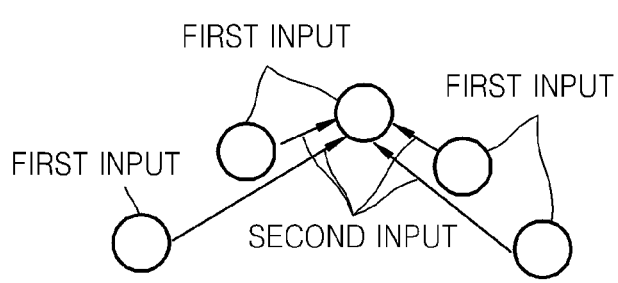
(501)
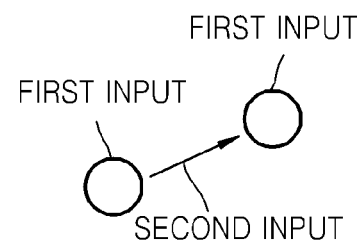
(502)

FIG. 8
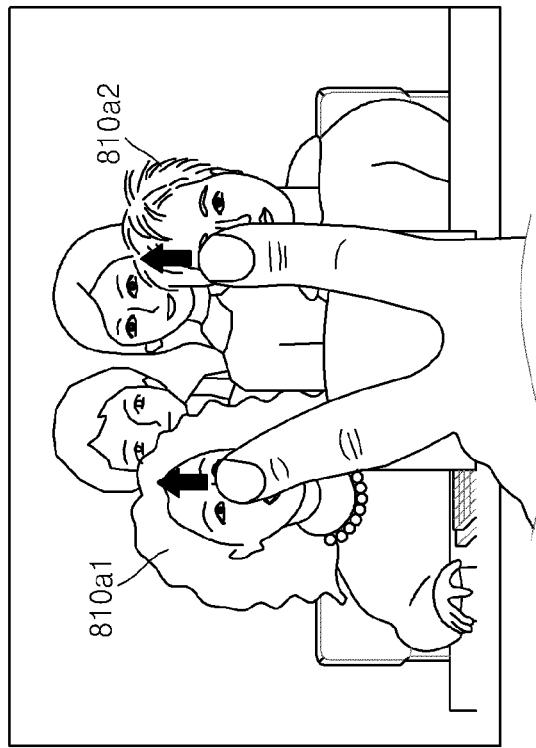
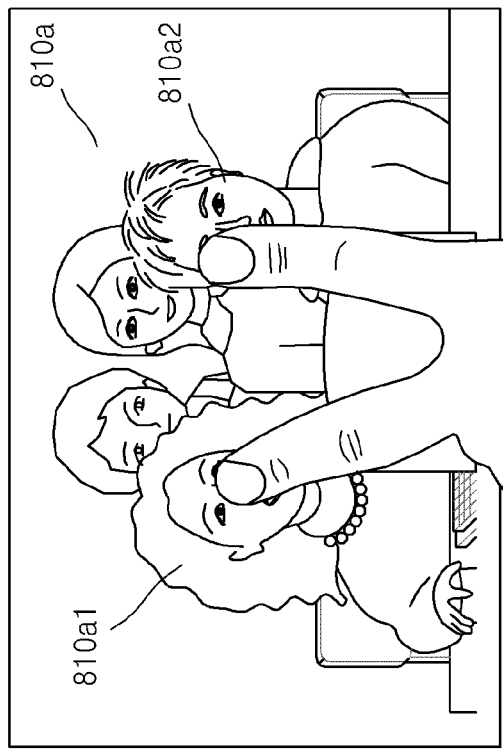
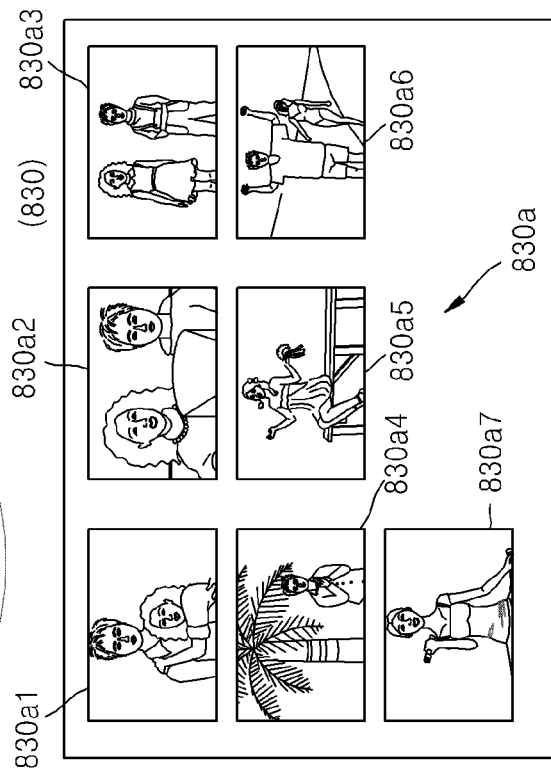

FIG. 9
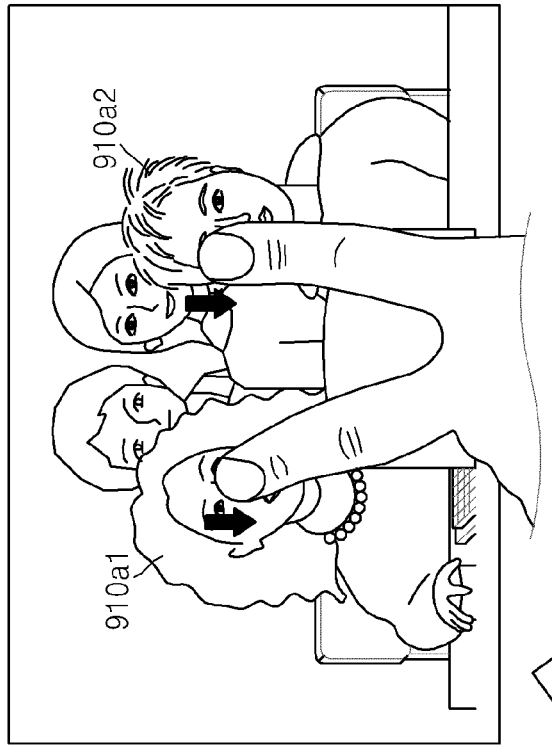
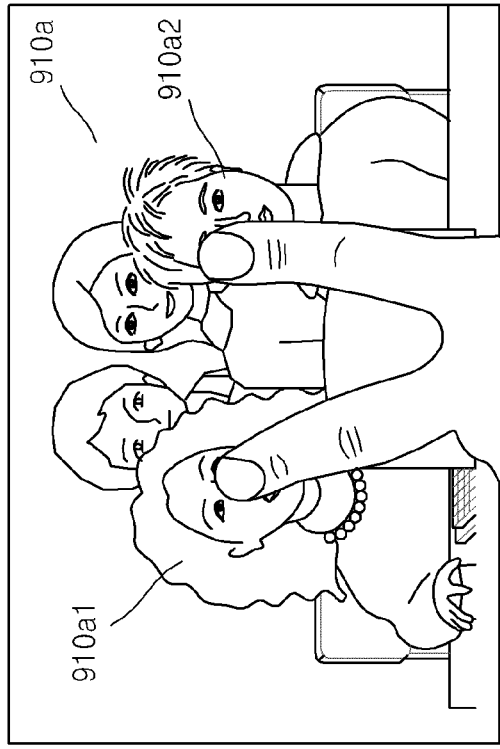
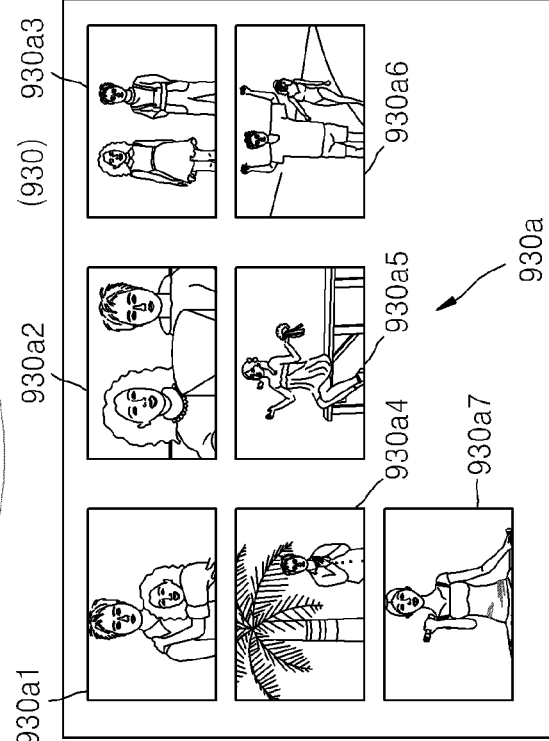

FIG. 16
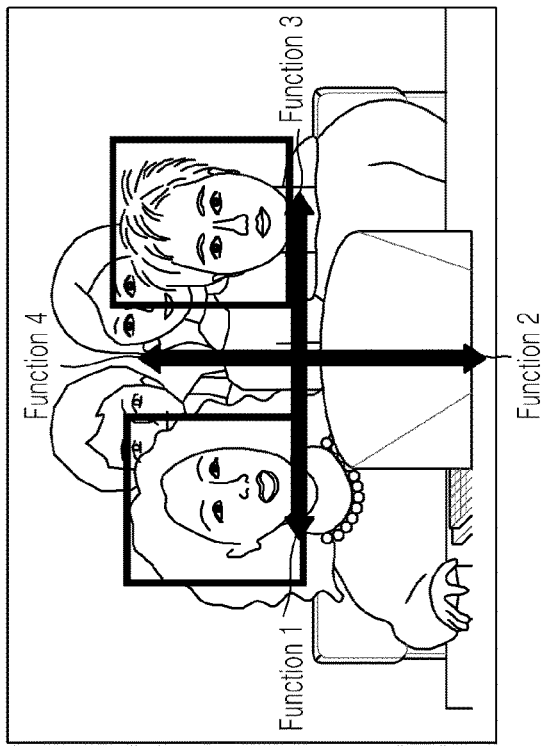
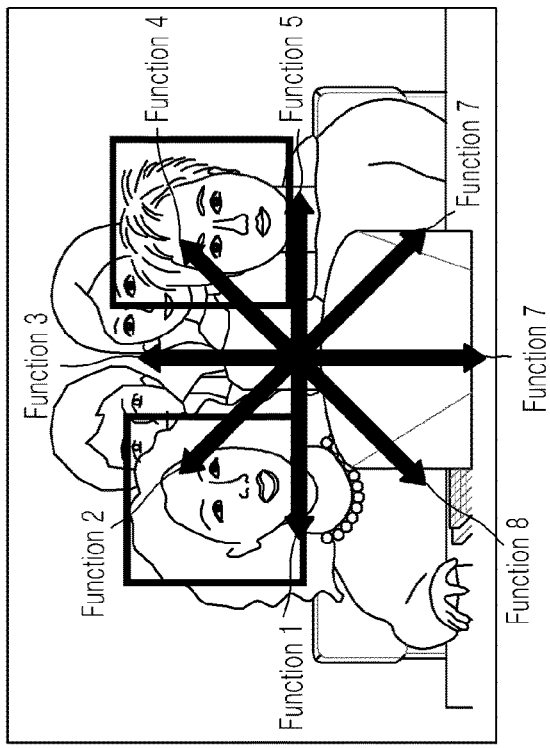
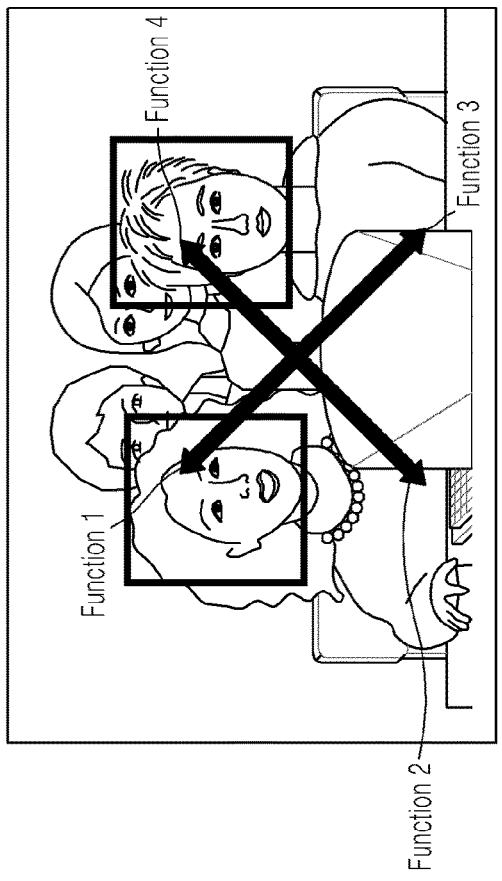

INFORMATION SEARCH METHOD AND DEVICE AND COMPUTER READABLE RECORDING MEDIUM THEREOF

CROSS-REFERENCE TO RELATED APPLICATIONS

This application is a continuation application of U.S. patent application Ser. No. 14/105,277, filed on Dec. 13, 2013, which claims priority under 35 U.S.C. § 119 from Korean Patent Application No. 10-2012-0146408, filed on Dec. 14, 2012, in the Korean Intellectual Property Office, the disclosures of which are hereby incorporated by reference in their entirety.

BACKGROUND OF THE INVENTION

1. Field of the Invention

The present general inventive concept relates to an information search method and device, and more particularly to, an information search method and device based on a displayed image.

2. Description of the Related Art

As a capacity of a memory installed in devices and a data storage amount using cloud servers have been increased, information search methods for promptly and accurately providing information desired by users have been proposed.

However, conventional information search methods are generally performed based on user queries. Thus, easier and more intuitive information search methods are required.

SUMMARY OF THE INVENTION

The present general inventive concept provides an intuitive information search method and device based on a displayed image and a computer readable recording medium thereof.

The present general inventive concept also provides an information search method and device based on a search relationship between a plurality of objects selected according to a displayed image and a computer readable recording medium thereof.

The present general inventive concept also provides a service providing method and device based on a relationship between a plurality of objects selected according to a displayed image and a computer readable recording medium thereof.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing an information search method based on an image displayed on a device, the method including recognizing a first input indicating a selection related to a plurality of objects included in the image, recognizing a second input indicating a search relationship between the selected plurality of objects, and searching for information based on the first input and the second input; and outputting found information through the device.

The search relationship between the selected plurality of objects may include one of a same layer relationship indicating that a relationship between the plurality of objects have a same level when searching for the information and a high-low layer relationship indicating that the relationship between the plurality of objects have high-low level when searching for the information.

In a case that the search relationship between the selected plurality of objects is the same layer relationship, the second input may include one of a touch based gesture indicating gathering the selected plurality of objects and a touch based gesture indicating moving the selected plurality of objects to at least one location other than display locations of the selected plurality of objects.

In a case that the search relationship between the selected plurality of objects is the high-low layer relationship, the second input may include one of a touch based gesture indicating moving the remainder of selected object excluding one object among the selected plurality of objects to a display location of the excluded one object and a touch based gesture indicating moving at least one of the selected plurality of objects to a display location of one of the selected plurality of objects.

The touch based gesture may include a touch and drag.

In a case where the search relationship between the selected plurality of objects is the same layer relationship, the searching for the information may include searching for information including all of the selected plurality of objects. In a case where the search relationship between the selected plurality of objects is the high-low layer relationship, the searching for the information may include searching for information according to the high-low layer relationship between the selected plurality of objects.

In a case where the search relationship between the selected plurality of objects is the same layer relationship, the searching for the information may include searching for information regarding at least one of the selected plurality of objects. In a case where the search relationship between the selected plurality of objects is the high-low layer relationship, the searching for the information may include searching for information according to high-low layer relationship between the selected plurality of objects.

In a case where the search relationship between the selected plurality of objects is the same layer relationship, the searching for the information may include displaying information used to select one of an information search item including at least one of the selected plurality of objects and an information search item including all of the selected plurality of objects, and searching for the information according to the information search item selected based on the displayed information. In a case where the search relationship between the selected plurality of objects is the high-low layer relationship, the searching for the information may include searching for the information according to high-low layer relationship between the selected plurality of objects.

The first input may include one of a touch based gesture indicating a long touch on the selected plurality of objects or each object and a touch based gesture indicating a closed region on the selected plurality of objects or the each object.

The searching for the information may include: displaying at least one search item determined according to the first input and the second input; and searching for the information based on a search item selected from the displayed at least one search item.

The method may further include displaying information indicating recognition related to the first input by the device.

The information indicating the recognition related to the first input by the device may include one of information indicating closed regions based on outlines of the selected plurality of objects or each object, information based on a cut-out image based on the outlines of the selected plurality of objects or the each object, and a multi screen based on the cut-out image.

The method may further include displaying information indicating recognition related to the second input by the device.

The searching for the information may be performed with respect to at least one of the device and at least one external device connected to the device.

The found information may include at least one of image based information and text based information.

The foregoing and/or other features and utilities of the present general inventive concept may also be achieved by providing a device including a storage unit to store at least one piece of information and at least one program, a touch screen to display an image, to receive a first input indicating a selection related to a plurality of objects included in the image, to receive a second input indicating a search relationship between the selected plurality of objects, and to display information searched for based on the first input and the second input, and a processor to provide a user interface based on the touch screen, to recognize the first input and the second input received through the touch screen, to search for information from the storage unit according to the first input and the second input, and output found information on the touch screen.

The foregoing and/or other features and utilities of the present general inventive concept may also be achieved by providing a device including a touch screen to display an image and to receive a user input based on the displayed image, a processor to provide a user interface based on the touch screen, and a storage unit to store at least one program configured to be executed by the processor and information that may be searchable based on the image, wherein the program includes commands to recognize a first input indicating a selection related to a plurality of objects included in the image, to recognize a second input indicating a search relationship between the selected plurality of objects, to search for information searched for based on the first input and the second input, and to output found information on the touch screen.

The foregoing and/or other features and utilities of the present general inventive concept may also be achieved by providing a service providing method based on a displayed image, the method including recognizing a first input indicating a selection related to a plurality of objects included in the image, recognizing a second input indicating a relationship between the selected plurality of objects, and displaying at least one service item provided based on the first input and the second input, and executing a service according to a service item selected based on the displayed at least one service item.

The foregoing and/or other features and utilities of the present general inventive concept may also be achieved by providing a computer readable recording medium storing one or more programs including a command language to execute an information search method based on an image displayed on a device, wherein the information search method based on an image displayed on a device is performed in the same manner as the above-described information search method based on an image displayed on a device.

The foregoing and/or other features and utilities of the present general inventive concept may also be achieved by providing a computer readable recording medium storing one or more programs including a command language for executing an service providing method based on a displayed image, wherein the service providing method based on a displayed image is performed in the same manner as the above-described service providing method based on a displayed image.

The foregoing and/or other features and utilities of the present general inventive concept may also be achieved by providing a device to perform an information search method, the device including a display panel to display an image including one or more objects on a screen thereof, and a processor configured to control the display panel to receive selection of the objects from the image of the display panel as a first input, to receive a movement of at least one position of the selected objects with respect to the other one of the selected objects as a second input, and to display one or more images searched according to the first input and the second input.

The display panel may differently display the selected objects and non-selected objects according to existence of a user input thereon.

The display panel may display the at least one position of the selected objects at a different position.

The screen of the display panel may include a first screen to display the image including the objects, a second screen to display the selection of the objects, a third screen to display an indication of the movement, and a fourth screen to display the one or more searched images.

The display panel may display the second screen and the third screen according to a user interaction with the display panel. The display panel may display the first screen and the fourth screen according to operations of the processor without the user interaction with the display panel.

The second screen may include the first screen.

The second screen may be different from the first screen.

The third screen may include the first screen and the second screen.

The third screen may be different from the first screen and the second screen.

The foregoing and/or other features and utilities of the present general inventive concept may also be achieved by providing an information search method based on a displayed image, the method including displaying an image including one or more objects on a screen of a display panel, receiving selection of the objects from the image of the display panel as a first input, receiving a movement of at least one position of the selected objects with respect to the other one of the selected objects as a second input, and displaying one or more images searched according to the first input and the second input.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 illustrates screen examples of inputting a second input in the image based information search method according to an embodiment of the present general inventive concept;

FIG. 5 illustrates screen examples of inputting a second input in the image based information search method according to another embodiment of the present general inventive concept;

FIGS. 7 through 9 illustrates screen examples of a first input, a second input, and found information;

FIG. 16 illustrates screen examples of displaying a plurality of search items;

DETAILED DESCRIPTION OF THE PREFERRED EMBODIMENTS

Figure 1A:
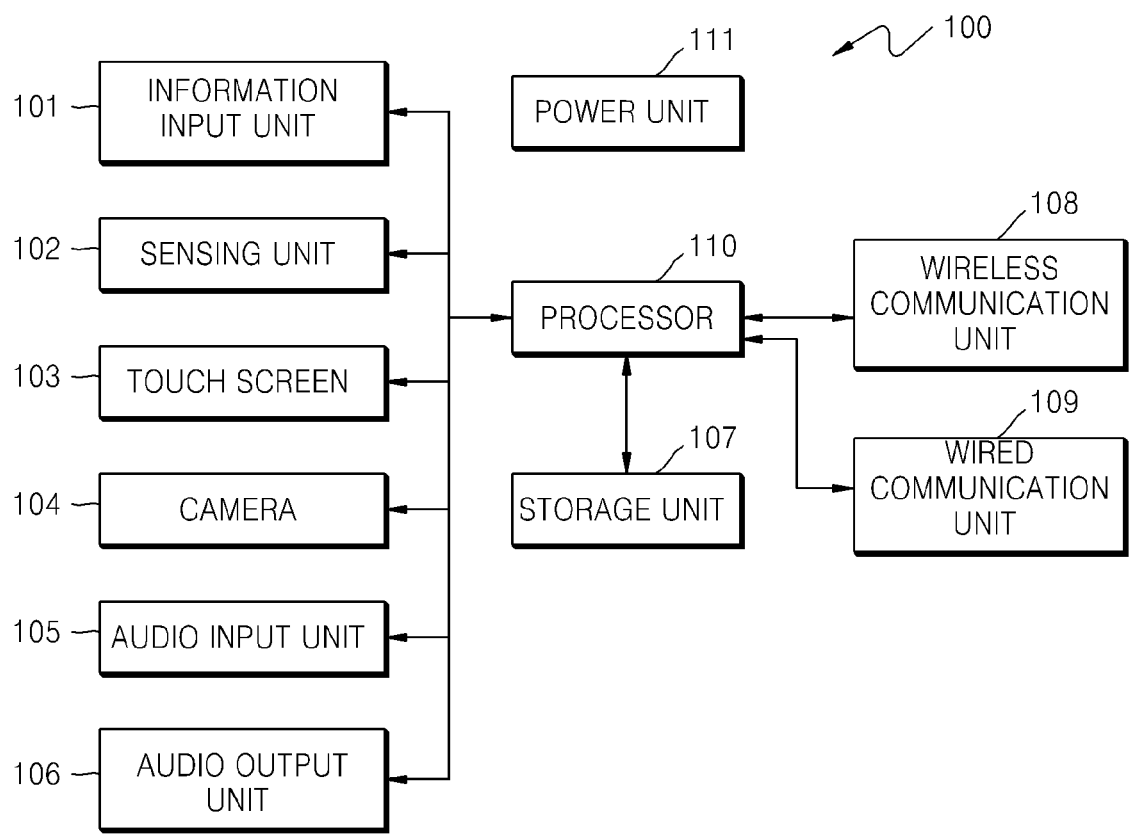
FIG. 1A is a block diagram illustrating a device according to an embodiment of the present general inventive concept.

As the present invention allows for various changes and numerous embodiments, particular embodiments will be illustrated in the drawings and described in detail in the written description. However, this is not intended to limit the present general inventive concept to particular modes of practice, and it will be appreciated that all changes, equivalents, and substitutes that do not depart from the spirit and technical scope of the present general inventive concept are encompassed in the present general inventive concept. In the description of the present general inventive concept, certain detailed explanations of the related art are omitted when it is deemed that they may unnecessarily obscure the essence of the general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Terms such as "first" and "second" are used herein merely to describe a variety of constituent elements, but the constituent elements are not limited by the terms. The terms are used only for the purpose of distinguishing one constituent element from another constituent element.

Most of the terms used herein are general terms that are widely used in the technical art to which the present general inventive concept pertains. However, some of the terms used herein may be created to reflect intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present general inventive concept.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Throughout this specification, the term 'input' may be used to refer to a user input that is a touch based input. The touch based input may include a user request, a user selection (for example, a selection of a plurality of objects on an image) or a user command (for example, a command for setting a search relationship between a plurality of selected objects), but is not limited thereto. The touch based input may depend on a touch based user gesture. The touch based user gesture may include, for example, a tap (or a touch), a long tap (or a long touch), a touch and hold, a touch and drag, a double tap, a drag, panning, a flick, a drag and drop, a sweep, and the like, but is not limited thereto.

The input is not limited to the above-described touch based user gestures. For example, the input may be defined as a motion based input or a vision based input.

The motion based input may be based on a device motion based user gesture (for example, a device shaking, a device knocking, etc.) performed by a user. For example, a search relationship between selected objects that will be described in the embodiments later may be set as a high-low layer relationship or a same layer relationship according to a device shaking pattern or direction. The device shaking pattern or direction used to set a search relationship between selected objects as the high-low layer relationship or the same layer relationship may be set in advance. For example, in a case where the device is shaken up and down, the motion based input is defined in advance in such a way that the search relationship between selected objects may be set as the high-low layer relationship. The high-low layer relationship between objects may be referred to as a parent-child layer relationship between objects.

The vision based input may be based on a user gesture recognized through analysis of an input image obtained by using a camera without contacting the device. For example, the search relationship between selected objects that will be described in the embodiments later may be set as an independent relationship or a dependent relationship through the analysis of the input image obtained by using the camera, the user input including a user space gesture (for example, a space gesture with fingers together) such as the touch based user gesture. The user space gesture used to set the search relationship between selected objects as an independent relationship or a dependent relationship may be set in advance.

The present general inventive concept will now be described more fully with reference to the accompanying drawings, in which exemplary embodiments of the general inventive concept are illustrated.

As used herein, the term "and/or" includes any and all combinations of one or more of the associated listed items. Expressions such as "at least one of," when preceding a list of elements, modify the entire list of elements and do not modify the individual elements of the list.

FIG. 1A is a block diagram illustrating a device 100 according to an embodiment of the present general inventive concept. Examples of the device 100 of FIG. 1A may include a smart phone, a smart TV, a personal computer (PC), a desk top, a smart board, a tablet PC, a mobile device, a handheld device or a handheld computer, a media player, an e-book terminal, a personal digital assistant (PDA), a digital camera capable of inputting a touch based user input, a digital consumer electronics (CE) device, (for example, an apparatus having a function of displaying an image and inputting a touch based user gesture), etc., but is not limited thereto.

The device 100 includes an information input unit 101, a sensing unit 102, a touch screen 103, a camera 104, an audio input unit 105, an audio output unit 106, a storage unit 107, a wireless communication unit 108, a wired communication unit 109, a processor 110, and a power unit 111. However, a construction of the device 100 is not limited to that illustrated in FIG. 1A. That is, the device 100 may include more or less elements than the elements of FIG. 1 according to a design or user preference.

The information input unit 101 may receive input data to control an operation of the device 100 and information usable to request an execution of an image based information search method according to an embodiment of the present general inventive concept, but is not limited thereto. The information input unit 101 may include a key pad, a dome switch, a jog wheel, a jog switch, a hardware button, a hot key, a touch pane, etc., but is not limited thereto.

The sensing unit 102 may sense a current status of the device 100 such as a location of the device 100, whether there is a user contact with the device 100, a movement of the device 100, an orientation of the device 100, an acceleration or deceleration of the device 100, etc., and generate a sensing signal to control the operation of the device 100. The sensing unit 102 may include a proximity sensor and a motion sensor. The sensing unit 102 may generate a signal that recognizes a sensor based user gesture.

The proximity sensor is a sensor to detect whether an object approaches a previously set defection surface or whether the object is present nearby by using a force of an electromagnetic field or an infrared ray without an actual physical touch. Examples of the proximity sensor include a transparent photoelectric sensor, a direct reflective photoelectric sensor, a mirror reflective photoelectric sensor, a high frequency oscillation photoelectric sensor, a capacitive photoelectric sensor, a magnetic photoelectric sensor, an infrared photoelectric sensor, etc.

The touch screen 103 may be configured as a resistive (decompression) touch screen or a capacitive touch screen, but is not limited thereto. The touch screen 103 may include a user request, a user selection, or a user command that depends on the above-described user touch based gesture. The user touch based gesture may be defined as various combinations of a touch frequency, a touch pattern, a touch area, and a touch intensity, but is not limited thereto. The touch screen 103 may include various sensors to sense a touch or proximity touch of the touch screen 103. Sensors included in the touch sensor 103 may generate signals that sense the above-described touch based user gestures or patterns. A proximity sensor usable with the touch screen 103 may be the same as the proximity sensor included in the sensing unit 102.

An example of the sensor to sense the touch of the touch screen 103 may include a tactile sensor. The tactile sensor may sense various types of information such as roughness of a touch surface, hardness of a touch object, a temperature at a touch point, etc. The proximity sensor is a sensor to detect whether an object approaches a previously set defective surface or whether the object is present nearby by using a force of an electromagnetic field or an infrared ray without an actual physical touch. Examples of the proximity sensor include a transparent photoelectric sensor, a direct reflective photoelectric sensor, a mirror reflective photoelectric sensor, a high frequency oscillation photoelectric sensor, a capacitive photoelectric sensor, a magnetic photoelectric sensor, an infrared photoelectric sensor, etc.

The touch of the touch screen 103 may be a touch of a touch panel by a pointer. A proximity touch of the touch screen 103 may be a movement of the pointer, that is, not actually touching the touch panel but approaching the touch panel to within a predetermined distance. The pointer is a tool usable to touch or proximity touch a specific portion of the touch screen 103. Examples of the pointer may include a stylus pen, a user's finger, etc., but is not limited thereto.

The touch screen 103 displays information processed by the device 100. For example, the touch screen 103 may display user gestures or touch patterns sensed through the sensors included in the touch screen 103, control data or user input information input through the information input unit 101 or a screen responding to a signal sensed through the sensing unit 102.

The camera 104 processes an image frame, such as a still image or a moving image, obtained by an image sensor (or a photo sensor) in an image call mode or a photographing mode. The processed image frame may be displayed on the touch screen 103. Accordingly, the image based information search method according to an embodiment of the present general inventive concept may be performed based on the image frame included in the still image or the moving image obtained by the camera 104.

The image frame processed by the camera 104 may be stored in the storage unit 107 or transmitted to an outside thereof through the wireless communication unit 108 or the wired communication unit 109. The image frame of the camera 104 may be an image useable in the processor 110 to perform the image-based information search method. The number of cameras 104 may be two or more according to the construction of the device 100. The camera 104 may be used as an input apparatus to recognize a user space gesture.

The audio input unit 105 may receive an input of an external acoustic signal in a call mode, a recording mode, or a voice recognition mode, convert the acoustic signal to electrical voice data, and transmit the electrical voice data to the processor 110. The audio input unit 105 may be configured as, for example, a microphone. The audio input unit 105 may be configured to include diverse noise removal algorithms to remove noise generated during a process to receive the input of the external acoustic signal.

The acoustic signal input by using the audio input unit 105 may include user input information usable to request the execution of the image based information search method according to an embodiment of the present general inventive concept. In a case where the acoustic signal is natural language user input information, the acoustic signal may be referred to as a voice recognition based user input. The external acoustic signal input through the audio input unit 105 may be stored in the storage unit 107 through the processor 110 or transmitted to an outside thereof through the processor 110 and the wireless communication unit 108 or through the processor 110 and the wired communication unit 109.

The audio output unit 106 outputs the acoustic signal or an audio signal that is received from an outside thereof or read from the storage unit 107 in the call mode or an audio reproduction mode. The audio output unit 106 may be configured as a speaker. If the audio signal is included in reproduced contents, the audio output unit 106 outputs the audio signal included in the reproduced contents. The audio input unit 105 and the audio output unit 106 may be integrally formed within a single unit, for example, a head set.

The storage unit 107 may include at least one program and/or a command set and resource that are configured to be executed in the processor 110 that will be described later. The at least one program includes at least one program to execute the image based information search method according to an embodiment of the present general inventive concept, an operating system program of the device 100, an application program related to diverse functions (or services) performed by the device 100, and a program to drive hardware components included in the device 100, but is not limited thereto.

A resource may include information that is searchable based on a first input and a second input. The searchable information may include at least one of image based information and text based information. For example, the searchable information may include one or more images or texts including all of one or more of selected objects, images or texts including at least one of the plurality of selected objects, and text information regarding a search item that is selectable according to the second input, but is not limited thereto.

The text information regarding the search item that is selectable is determined according to the first input and the second input. An example of the text information regarding the search item determined according to the first input and the second input will be described in more detail with reference to screen examples that will be described later.

The resource may also include user information of the device 100, information necessary to operate the application program set in the device 100, and information necessary to execute the program to drive the above-described hardware components, but is not limited thereto.

The storage unit 107 may include at least one storage medium of a flash memory, a hard disk type memory, a multimedia card micro type memory, a card type memory (for example, SD memory, XD memory, or the like), a random access memory (RAM), a static RAM (SRAM), a read-only memory (ROM), an electrically erasable programmable read-only memory (EEPROM), a programmable ROM (PROM), a magnetic memory, and an optical disk. However, the present general inventive concept is not limited thereto. The storage unit 107 may include a storage unit, for example, a volatile memory unit or a non-volatile memory unit.

The at least one program and/or the command set that are stored in the storage unit 107 may be classified as a plurality of modules according to corresponding functions.

Figure 1B:
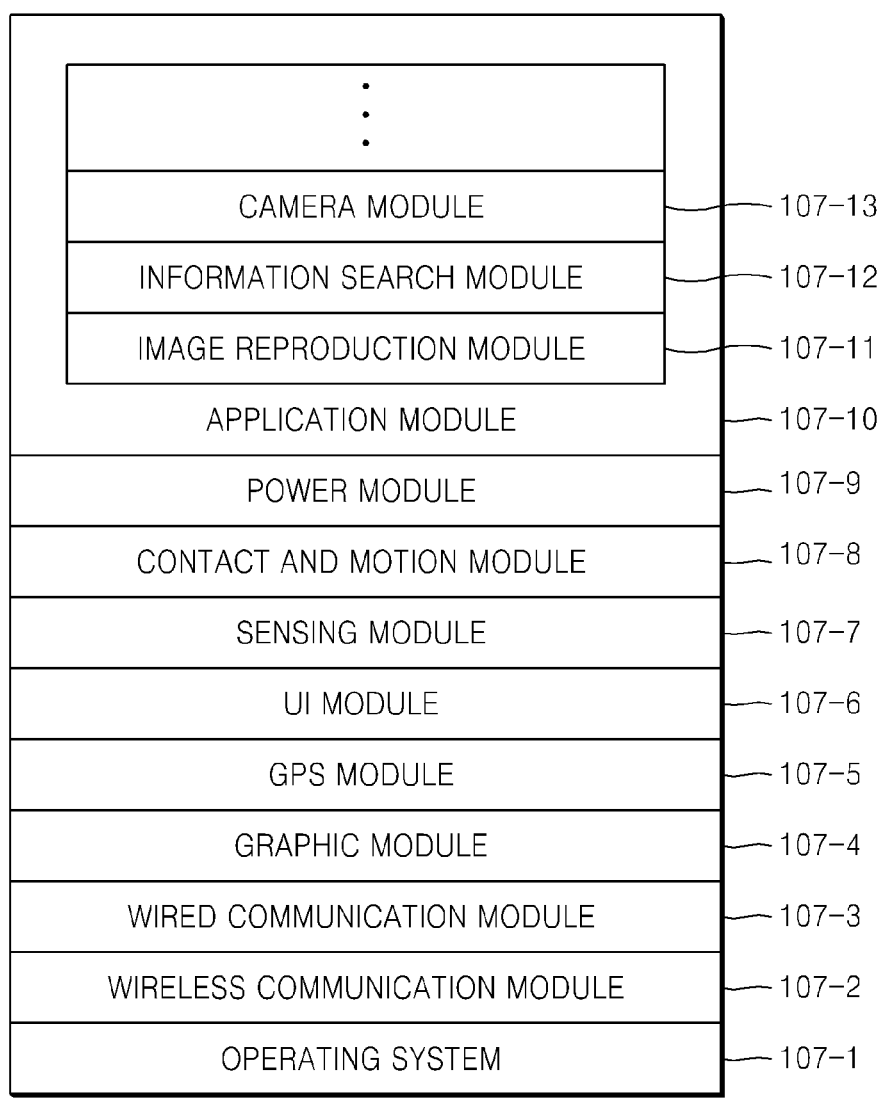
FIG. 1B illustrates an example of programs and/or command sets that are stored in a storage unit of the device of FIG. 1A and classified according to modules.

FIG. 1B illustrates an example of programs and/or command sets that are stored in the storage unit 107 and classified according to modules. Referring to FIG. 1B, the storage unit 107 may include an operating system 107-1, a wireless communication module 107-2, a wired communication module 107-3, a graphic module 107-4, a global positioning system (GPS) module 107-5, a user interface (UI) module 107-6, a sensing module 107-7, a contact and motion module 107-8, a power module 107-9, and an application module 107-10, but is not limited thereto.

The application module 107-10 includes an image reproduction module 107-11, an information search module 107-12, and a camera module 107-13, but is not limited thereto. For example, the application module 107-10 may include diverse modules such as an email module, a social networking service (SNS) module, a video conference module, an image management module, a browsing module, a calendar module, a widget module, a search module, a Word document preparation module, etc.

The operating system 107-1 controls and manages a general function of the device 100 and includes a software component to enable communication between hardware and software components included in the device 100.

The wireless communication module 107-2 may include a software component to enable communication with at least one external device (not illustrated) through the wireless communication unit 108 and to process data received from and transmitted to the at least one external device through the wireless communication unit 108. The at least one external device may include at least one of a cloud server and a device close or wired- or wireless-connectable to the device 100.

The wireless communication module 107-2 according to an embodiment of the present general inventive concept may request an information search from the external device when searching for information and receive found information from the external device.

The wired communication module 107-3 includes a software component to enable communication between the external device (not illustrated) and the wired communication unit 109 configured as an element such as a universal serial bus (USB) and processing of data received from and transmitted to the at least one external device through the wireless communication unit 108.

The graphic module 107-4 includes a software component for brightness adjustment and rendering of graphic displayed on the touch screen 103 and a software component to provide a virtual keyboard (or a soft keyboard) to input text in the application module 107-10.

The GPS module 107-5 includes a software component to determine a location of the device 100 and to provide the determined location to an application that provides a location based service. The UI module 107-6 includes a software component to provide a UI necessary for an application that provides a touch screen 103 based UI information.

The sensing module 107-7 includes a software component to determine sensing information of the sensing unit 102 as sensing unit-based sensing information and to provide a determined sensing information based service to the application module 107-10. The contact and motion module 107-8 includes a software component to detect a touch contact of the touch screen 103 as a touch screen-based touch contact, to track a contact based motion, and to provide the tracked motion to the application module 107-10 requiring the tracked motion.

The power module 107-9 includes a software component to link with the operating system 107-1, to control a power supply to hardware components included in the device 100, and to control a sleep mode with respect to power supplied to the touch screen 103.

Functions of the modules included in the application module 107-10 may be intuitively inferred by a user from their titles, and thus only the application module 107-10 related to an embodiment of the present general inventive concept will now be described.

For example, when the image reproduction module 107-11 is executed to display an image (or a single image) on the touch screen 103, the information search module 107-12 is executed to perform a displayed image based information search service. After the displayed image based information search service is performed, if the above-described first and second outputs are recognized according to the information sensed by the contact and motion module 107-8 and/or the sensing module 107-7, information is searched from at least one of the at least one external device (not illustrated) connected through the storage unit 107, the wireless communication unit 108, and the wired communication unit 109 based on the recognized first and second inputs.

If the information that is searched is found, the information search module 107-12 outputs the found information to the touch screen 103. The UI module 107-6 may display the found information on the touch screen 103, and, when the first and second inputs are recognized, output recognized result information on the touch screen 103.

The term of "search" processed based on the first and second inputs may be referred to as an interaction between a user and the device 100. That is, recognizing of the first input may be defined as an interaction between the user and the device 100 with respect to a selection of a plurality of objects, recognizing of the second input may be defined as an interaction between the user and the device 100 with respect to a search relationship between a plurality of objects, and displaying of the found information on the touch screen 103 may be referred to as a search interaction. For example, the device 100 can receive a user input from the touch screen 103 and recognize the received user input as the first input, and then, the device 100 can receive another user input from the touch screen 103 when the first input is recognized and recognize the received another user input as the second input.

It is possible that the storage unit 107 of FIG. 1A does not store the modules included in the application module 107-10 from among the programs and/or command sets of FIG. 1B. Instead, the storage unit 107 may store only location information such as a uniform resource locator (URL) of the application module 107-10 or display information that may indicate the application module 107-10. In a case where the storage unit 107 does not store the modules included in the application module 107-10, the processor 110 may access an external device through the wireless communication unit 108 or the wired communication unit 109 and use a program and/or command set that correspond to the application module 107-10 and is/are stored in the external device.

In a case where the storage unit 107 stores only the location information of the application module 107-10 or the display information that may indicate the application module 107-10, the processor 110 may search for information stored in the external device through the wireless communication unit 108 or the wired communication unit 109 by using the location information of an application corresponding to a user selection signal or the display information displayed on the touch screen 103 to indicate the application module 107-10.

The wireless communication unit 108 may transmit and receive data to and from the external device over a wireless network such as wireless Internet, wireless Intranet, a wireless phone network, a wireless local area network (LAN), a W-Fi network, a W-Fi direct (WFD) network, a 3G network, a 4G Long Term Evolution (LTE) network, a Bluetooth network, an infrared data association (IrDA) network, a radio frequency identification (RFID) network, a ultra wideband (UWB) network, and a Zigbee network.

The wireless communication unit 108 may include at least one of a broadcasting reception module, a mobile communication module, a wireless Internet module, a wired Internet module, a short distance communication module, and a location information module but is not limited thereto.

The wired communication unit 109 may transmit and receive data to and from the external device over a wired network such as wired Internet. The wired communication unit 109 may transmit and receive data with the external device by using a plug and play interface such as a UBS port (not illustrated). The wired communication unit 109 may not be an element of the device 100.

The power unit 111 supplies power to the hardware components included in the device 100. The power unit 111 includes at least one power source such as a battery and an alternating current (AC) power source. The device 100 may not include the power unit 111 and may include a connection unit (not illustrated) that is connectable to an external power supply unit (not illustrated).

The processor 110 may be referred to as one or more processors that control a general operation of the device 100. The processor 110 may generally control the information input unit 101, the sensing unit 012, the touch screen 103, the camera 104, the audio input unit 105, the audio output unit 106, the storage unit 107, the wireless communication unit 108, the wired communication unit 109, and the power unit 111 through the operating system 107-1 and the modules 107-2 through 107-13 that are stored in the storage unit 107. Thus, the processor 110 may be referred to as a controller, a microprocessor, a digital signal processor, etc.

The processor 110 may provide a user interface by using the operating system 107-1, the UI module 107-6, the information input unit 101, the sensing unit 012, the touch screen 103, the camera 104, and the audio input unit 105.

The processor 110 may execute at least one program related to the image based information search method according to an embodiment of the present general inventive concept and perform methods as illustrated in flowcharts of FIGS. 2, 10, and 14, which will be described later. The processor 110 may execute the program by reading the program from the storage unit 107 or downloading the program from an external device connected through the wireless communication unit 108 or the wired communication unit 109. In this regard, the external device may be referred to as an application providing server or an application market server. The external device may include a cloud server or a communicable device close to the device 100. The external device may be another device similar to or same as the device 100. The processor 110 may be understood to include an interface function unit interfacing between various hardware components included in the device 100 and the processor 110 thereof.

Figure 2:
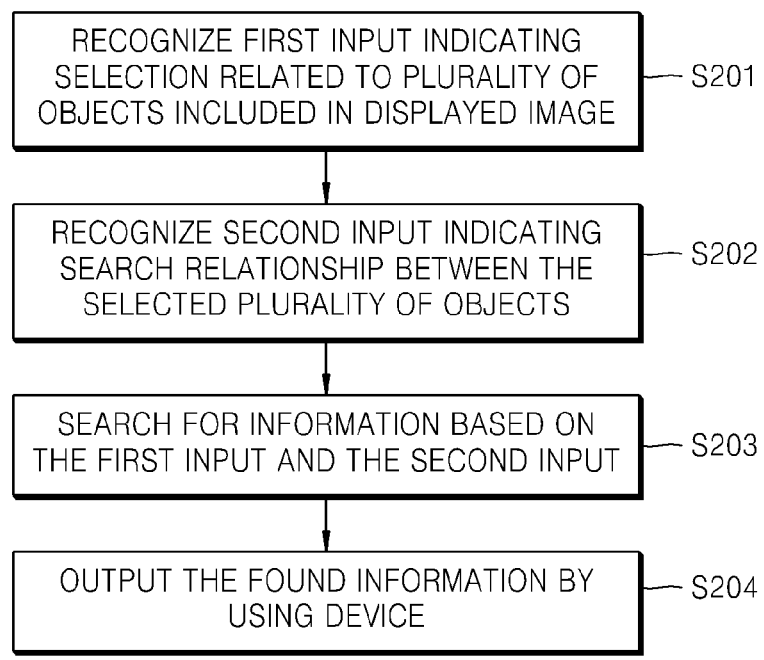
FIG. 2 is a flowchart illustrating an image based information search method according to an embodiment of the present general inventive concept.

FIG. 2 is a flowchart illustrating an image based information search method according to an embodiment of the present general inventive concept. The image based information search method of FIG. 2 may be performed by the processor 110 of FIG. 1A.

Referring to FIG. 2, the processor 110 recognizes a first input indicating a selection related to a plurality of objects included in an image displayed on the touch screen 103 at operation S201.

Figure 3:
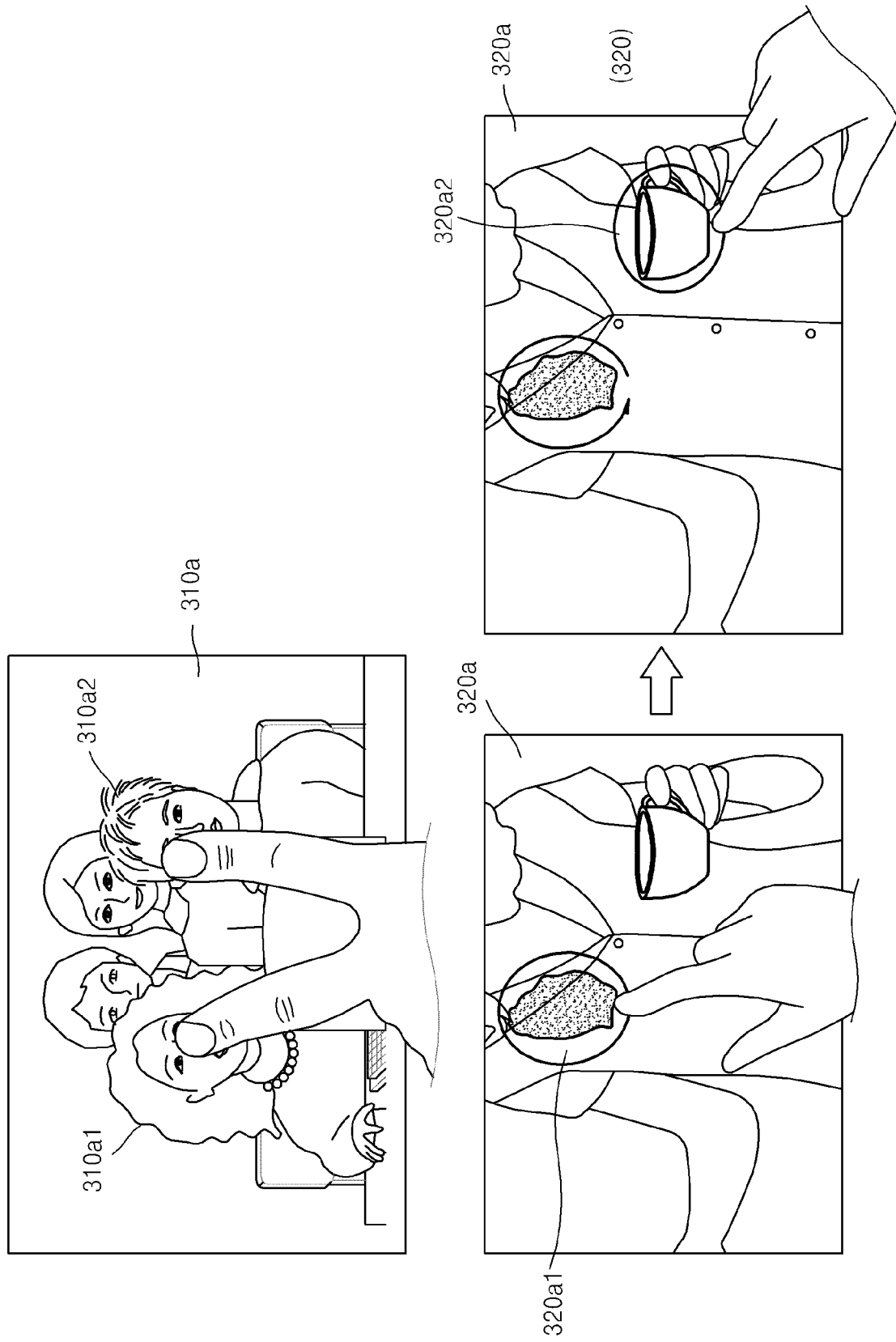
FIG. 3 illustrates screen examples of inputting a first input in the image based information search method according to an embodiment of the present general inventive concept.

FIG. 3 illustrates screen examples to input a first input in the image based information search method according to an embodiment of the present general inventive concept. Referring to FIG. 3, a screen 310 is an example whereby the first input is input by touching a plurality of objects 310a1 and 310a2 included in an image 310a displayed on the touch screen 103. Here, touching may be referred to as long touching during a longer period of time than a reference period of time. Accordingly, the processor 110 recognizes a selection of objects 310a1 and 310a2 corresponding to touch points on the image 310a displayed on the screen 310. Touch points may be referred to as longer touch points than reference touch points. A touch based user gesture indicating the selection of the plurality of objects is not limited to the above-described long touch, and the selection of the plurality of objects 310a1 and 310a2 may not be made concurrently. It is also possible that objects can be simultaneously selected. It is also possible that objects can be selected independently. When the selection is made independently, a second selection of a second object may be made within a reference period of time from a first selection of a first object. It is also possible that objects can be selected from different images displayed on the corresponding screen. The processor 110 can recognize the selection of the objects as the first input.

Referring to FIG. 3, a screen 320 is an example whereby the first input is input by a user gesture to set a circular closed region of each of the plurality of objects 320a1 and 320a2 of an image 320a displayed on the touch screen 103. The user gesture to set the circular closed region is not limited to that illustrated on the screen 320. That is, the user gesture to set the circular closed region may include a squared or triangular user gesture that includes an object to be selected. The circular closed region may not be necessarily set to meet a start point and an end point and may include a user gesture indicating joining between the start point and the end point. The user gesture may be a gesture to form a line indicating the object. It is also possible that objects can be simultaneously selected. It is also possible that objects can be selected independently. When the selection is made independently, a second selection of a second object may be made within a reference period of time from a first selection of a first object. It is also possible that objects can be selected from different images displayed on the corresponding screen. The processor 110 can recognize the selection of the objects describe above or hereinafter as the first input.

The processor 110 recognizes a second input indicating a search relationship between the plurality of objects selected based on the image displayed on the touch screen 103 at operation S202.

FIG. 4 illustrates screen examples of inputting a second input in the image based information search method, according to an embodiment of the present invention. In FIG. 4, the second input is used to set a search relationship between a plurality of objects selected when searching for information as a same layer relationship.

Referring to FIG. 4, a screen 401 is an example of the second input by a touch based user gesture to gather the plurality of selected objects such that the gathered objects are placed in one place. That is, the screen 401 illustrates that a first input (for example, a long touch) indicating a selection of five objects included in a single image is input, and then a second input is input to set a search relationship between the selected five objects as the same layer relationship by dragging a point at which the first input is input to a point in the displayed image.

In this regard, although the second input may be defined to continuously perform the above-described drag while maintaining a touch status after the first input is input, the second input may be defined as a touch and drag that touches a point at which the first input is input and drags the point to the above-described one point. In a case where the point at which the first input is input is retouched, an error between a previous x and y coordinate and a current x and y coordinate with respect to the touch point may occur. However, if the current x and y coordinate is within a display region of the same object, the above-described error may be disregarded. As seen from the screen 401, a point on the screen 401 may be defined as a point at which five fingers corresponding to the five objects may meet together.

Referring to FIG. 4, a screen 402 is an example of the second input by a touch based user gesture to move the plurality of selected objects to locations other than display locations of the plurality of objects. That is, the screen 402 shows that the first input indicating the selection of five objects included in the single image is input, and then the search relationship between the five objects selected by inputting the second input for dragging the point at which the first input is input below the point by a predetermined length are set as the same layer relationship.

Regarding the screen 402 of FIG. 4, as described with respect to the screen 401, although the second input may be defined to continuously perform the above-described drag operation while maintaining a touch status after the first input is input, the second input may be defined as a touch and drag that involves touching the point at which the first input is input and dragging the point downward by a predetermined length from the point.

Referring to FIG. 4, a screen 403 is an example of the second input by a touch based user gesture to move a touch point by moving the plurality of selected objects to locations other than display locations of the plurality of objects, as described with respect to the screen 402. Regarding the screen 403, the second input is input by dragging the point, at which the first input is input, upward by a predetermined length from the point.

Referring to FIG. 4, a screen 404 is an example of the second input by a touch based user gesture to gather selected two objects such that the gathered objects are placed in a single point. The single point on the screen 404 may be defined as a point at which fingers that select two objects meet together or as a point in which the objects are disposed to overlap. The second input may not be an input that the objects are really disposed to overlap, but the second input may be a user gesture meaning overlap of the objects.

Referring to FIG. 4, a screen 405 is an example of the second input by a touch based user gesture to move a touch point inward by moving two selected objects from the point at which the first input is input. An inward moving distance may be set within the predetermined distance described with reference to the screens 402 and 403.

Referring to FIG. 4, a screen 406 is an example of the second input by a touch based user gesture to move a touch point outward within a predetermined length by moving selected two objects from the point at which the first input is input.

FIG. 4 illustrates the moving of the objects to input the second input and FIG. 5 that will be explained later may involve moving display locations of a plurality of objects displayed on an image. However, the above-described moving may not involve actual moving of display location of objects but may involve moving a touch point on the image.

FIG. 5 illustrates screen examples of inputting a second input in the image based information search method according to an embodiment of the present general inventive concept. The second input of FIG. 5 is usable to set a search relationship between a plurality of objects selected when searching for information as a high-low layer relationship.

A screen 501 of FIG. 5 is an example of the second input by a touch based user gesture to move four of five selected objects to a display location of one of the five selected objects. In this case, the one selected object may be dependent from the other four selected objects.

A screen 502 of FIG. 5 is an example of the second input by a touch based user gesture to move from a display location of one of two selected objects to a display location of the other selected object. In this case, the other selected object may be dependent from the one selected object.

In an operation S203 of FIG. 2, the processor 110 recognizes a first input and a second input based on an image displayed on the touch screen 103 and searches for information based on the first input and the second input. That is, the processor 110 detects an object selected according to the recognized first input. The selected object is detected by detecting an outline of the object based on a touch point but is not limited thereto. If the selected object is detected, the processor 110 determines a search equation according to a search relationship between a plurality of objects selected according to the second input.

If the selected objects have a same layer relationship, information including all of the selected objects may be searched or information including at least one of the selected objects may be searched. When the selected objects have the same layer relationship, it may be previously defined whether to search for the information including all of the selected objects or the information including at least one of the selected objects.

That is, when previously selected objects have the same layer relationship, in a case where the information including all of the selected objects is defined to be searched for, the processor 110 searches for the information including all of the selected objects from at least one of the storage unit 107 and the above-described external device.

When the previously selected objects have the same layer relationship, in a case where the information including at least one of the selected objects is defined to be searched, the processor 110 searches for the information including at least one of the selected objects from at least one of the storage unit 107 and the above-described external device.

When the previously selected objects have the same layer relationship, in a case where the information including all of the selected objects and the information including at least one of the selected objects are defined to be selectively searched, the processor 110 displays information corresponding to an information search item (for example, an information search item including all of the selected objects or an information search item including at least one of the selected objects) on the touch screen 103 before searching for the information.

If the information search item including all of the selected objects is selected based on the information search item information displayed on the touch screen 103, the processor 110 searches for the information including all of the selected objects. However, if the information search item including at least one of the selected objects is selected based on information corresponding to the information search item displayed on the touch screen 103, the processor 110 searches for the information including at least one of the selected objects.

If the search relationship between the selected objects is a high-low layer relationship, the processor 110 determines a search equation according to high-low layer relationships between the selected objects and searches for the information.

Figure 6:
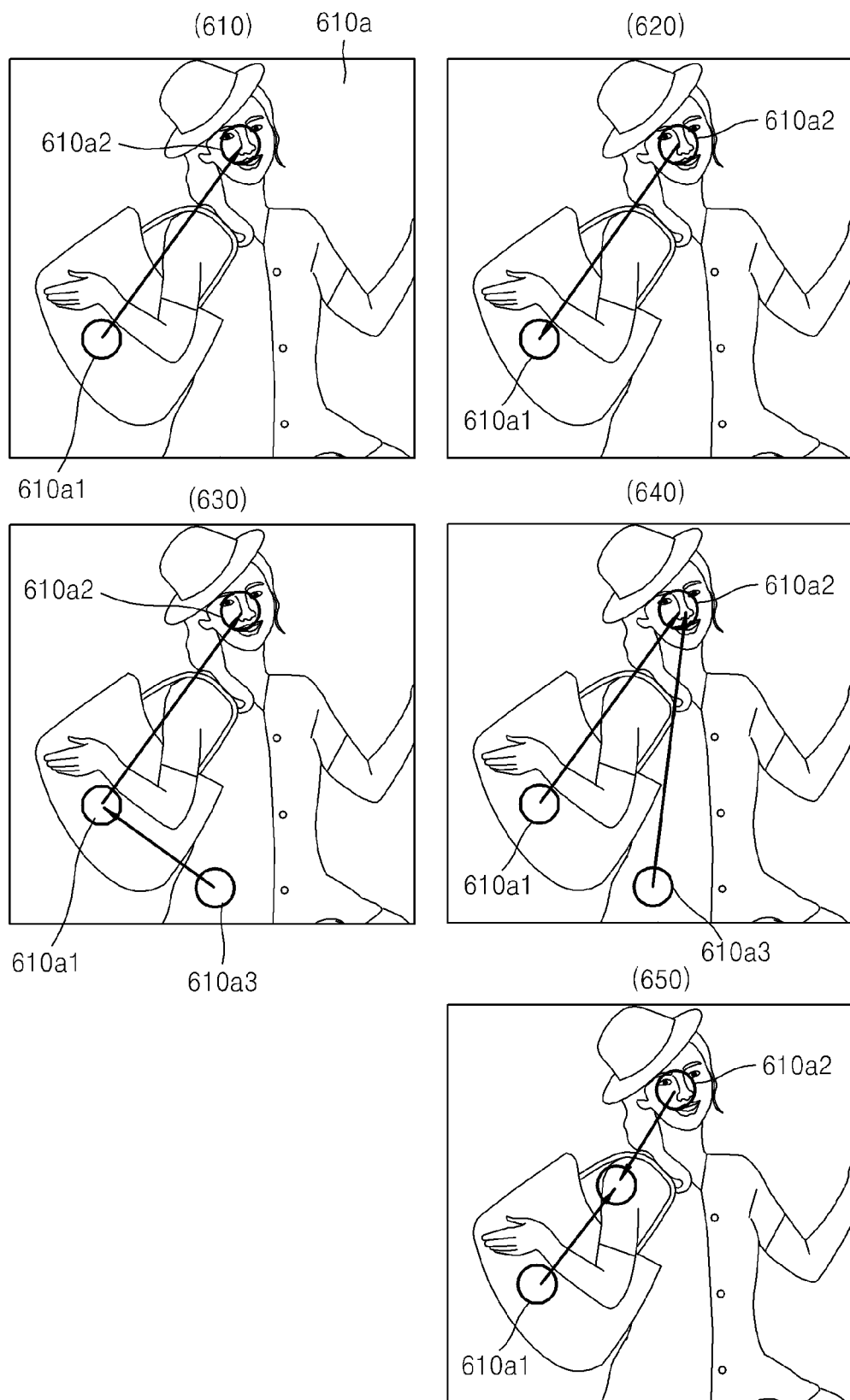
FIG. 6 illustrates screen examples of images to correspond to the screen examples of the second input of FIG. 5.

That is, as illustrated in a screen 610 of FIG. 6, if a selected object is a combination of a bag 610a1 and a face 610a2 of an image 610a, and a second input to move a touch point from the bag 610a1 to the face 610a2 is recognized, the processor 110 sets a search equation as a "person carrying a bag". Thus, the processor 110 searches for information regarding "an arbitrary person carrying the same bag as the bag carried by A" from at least one of the storage unit 107 and an external device.

As illustrated in a screen 620 of FIG. 6, if the selected object are a combination of a bag 610a1 and a face 610a2, and a second input to move the touch point from the face 610a2 to the bag 610a1 is recognized, the processor 110 sets the search equation as a "bag that A has". Thus, the processor 110 searches for information regarding "all bags that A has" from at least one of the storage unit 107 and the external device.

As illustrated in a screen 630 of FIG. 6, if a selected object is a combination of a bag 610a1, a face 610a2, and clothes 610a3, and a second input to move the touch point from the clothes 610a3 to the bag 610a1 and another second input to move the touch point from the bag 610a1 to the face 610a2 are recognized, the processor 110 sets the search equation as a "bag of clothes" and a "person carrying a bag". Thus, the processor 110 searches for information including "the same clothes and an arbitrary bag" and information including "an arbitrary person having the same bag" from at least one of the storage unit 107 and the external device.

As illustrated in a screen 640 of FIG. 6, if the selected object is a combination of a bag 610a1, a face 610a2, and clothes 610a3, and a second input to move the touch point from the clothes 610a3 to the face 610a2 and another second input to move the touch point from the bag 610a1 to the face 610a2 are recognized, the processor 110 sets the search equation as a "person wearing clothes" and a "person carrying a bag". Thus, the processor 110 searches for information including "an arbitrary person wearing the same clothes" and information including "an arbitrary person having the same bag" from at least one of the storage unit 107 and the external device.

A screen 650 of FIG. 6 is an example of inputting a second input indicating a search relationship between a plurality of selected objects as a same layer relationship. When a condition that the plurality of selected objects have the same layer relationship is set in the device 100, in a case where a search equation is defined as a logic "AND," the processor 110 searches for information including all of "the same bag" and "person A" from at least one of the storage unit 107 and the external device.

The found information may include at least one of image based information and text based information. A user may set whether to search for the information from the storage unit 107, the external device, or both the storage unit 107 and the external device. The processor 110 may display selectable search range information on the touch screen 103 in such a way that the user may set the above-described search range.

The processor 110 displays the found information on the touch screen 103 in operation S204 of FIG. 2. The found information may be displayed to overlap or superimpose with a displayed image, or the found information may be displayed on a separate space from the image in the screen, a separate page or in a pop up window on the displayed image.

Figure 7:
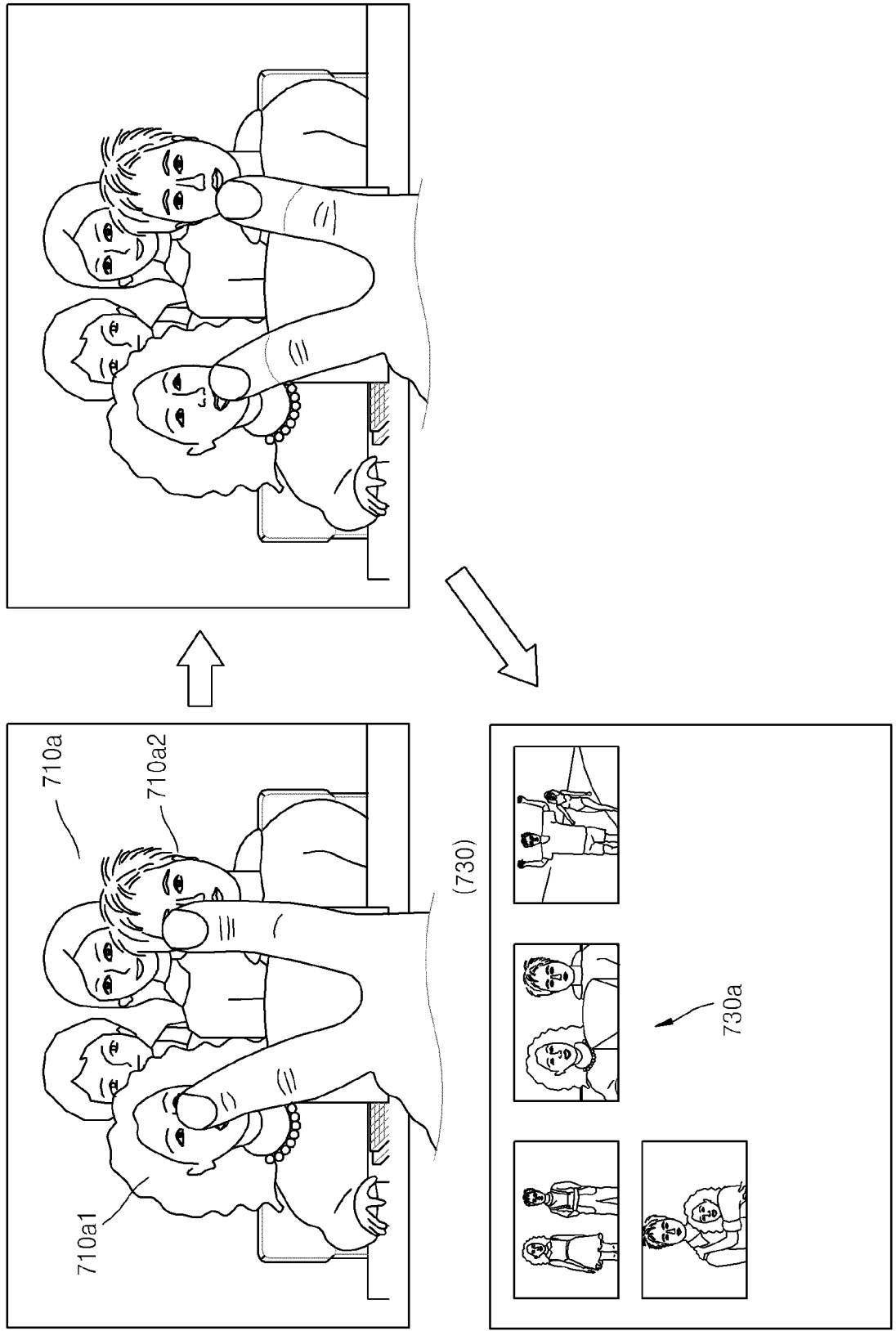

FIGS. 7 through 9 illustrate screen examples of relationships between the above-described first input, second input, and found information when a search relationship between a plurality of selected objects is a same layer relationship.

Referring to FIG. 7, a screen 710 is an example of inputting the first input to select two objects 710a1 and 710a2 included in a displayed image 710a, a screen 720 is an example of inputting the second input based on a user gesture of gathering display locations of the two selected objects 710a1 and 710a2 to one point after inputting the first input, and a screen 730 is an example of displaying images 730a1, 730a2, 730a3, and 730a4 including all the selected objects on an independent page.

Referring to FIG. 8, a screen 810 is an example of inputting the first input to select two objects 810a1 and 810a2 included in a displayed image 810a, a screen 820 is an example of inputting the second input based on a user gesture of concurrently moving display locations of the two selected objects 810a1 and 810a2 in an upward direction after inputting the first input, and a screen 830 is an example of displaying images 830a1, 830a2, 830a3, 830a4, 830a5, 830a6, and 830a7 including at least one of the selected objects 810a1 and 810a2 on an independent page.

Referring to FIG. 9, a screen 910 is an example of inputting the first input to select two objects 910a1 and 910a2 included in a displayed image 910a, a screen 820 is an example of inputting the second input based on a user gesture of concurrently moving display locations of the two selected objects 910a1 and 910a2 in a downward direction after inputting the first input, and a screen 930 is an example of displaying images 930a1, 930a2, 930a3, 930a4, 930a5, 930a6, and 930a7 including at least one of the selected objects 910a1 and 910a2 on an independent page.

Based on the descriptions provided with reference to FIGS. 7 through 9, according to an input pattern of a second input indicating that all of the selected objects have a same layer relationship, at least one image (or information) including all of a plurality of objects selected or at least one image (or information) including at least one of the selected objects may be searched.

Figure 10:
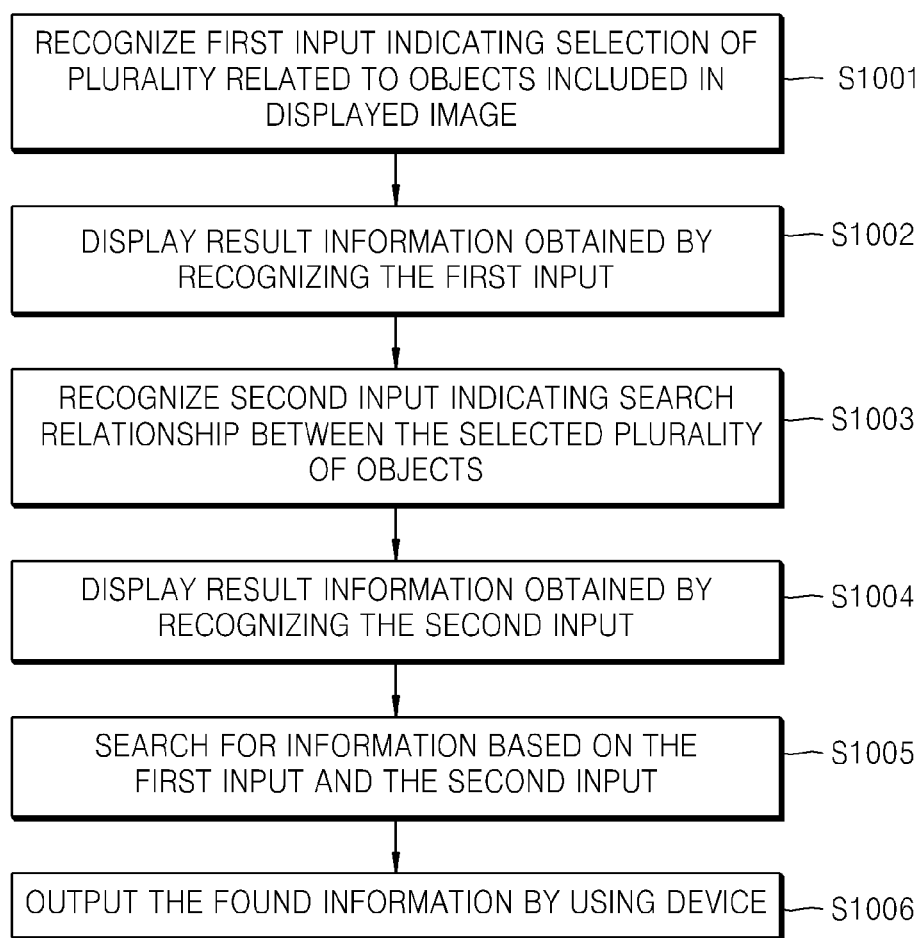
FIG. 10 is a flowchart illustrating an image based information search method according to an embodiment of the present general inventive concept.

FIG. 10 is a flowchart illustrating an image based information search method according to an embodiment of the present general inventive concept. The image based information search method of FIG. 10 further includes a function of displaying recognized result information on the touch screen 103 after recognizing a first input and displaying recognized result information on the touch screen 103 after recognizing a second input, compared to the image based information search method of FIG. 2.

That is, in operation S1001, the processor 110 recognizes the first input indicating a selection related to a plurality of objects included in an image displayed on the touch screen like operation 201 of FIG. 2.

Thus, in operation S1002, the processor 110 displays the result information obtained by recognizing the first input on the touch screen 103. The result information may be output in a closed region shape as a region including an outline of the objects detected according to the first input.

Figure 11:
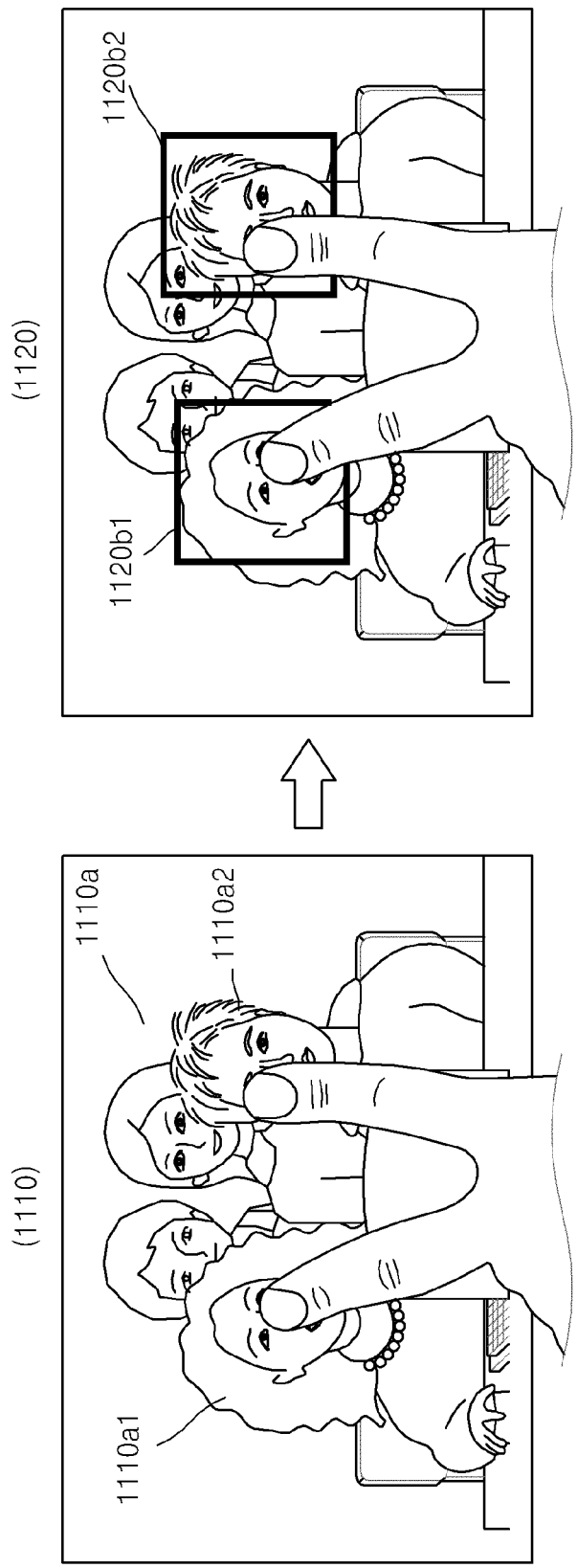
FIGS. 11 through 13 illustrates screen examples of displaying result information obtained by recognizing a first input of FIG. 10.
Figure 12:
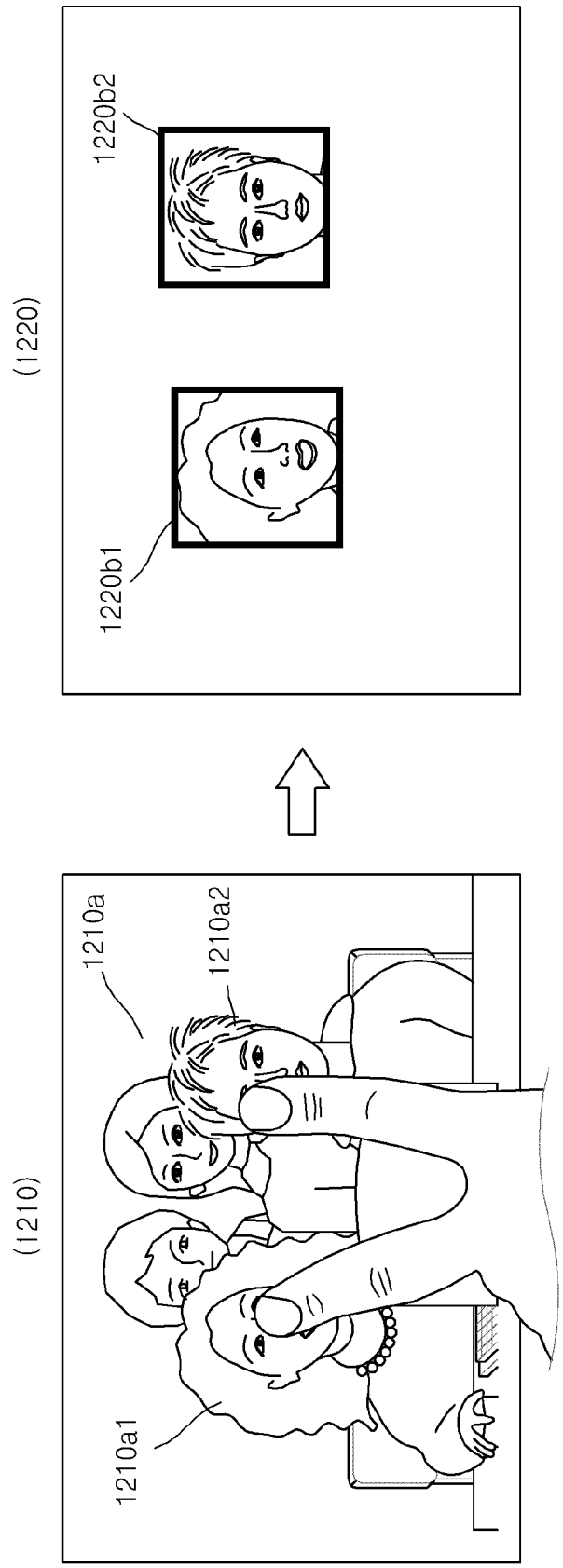
Figure 13:
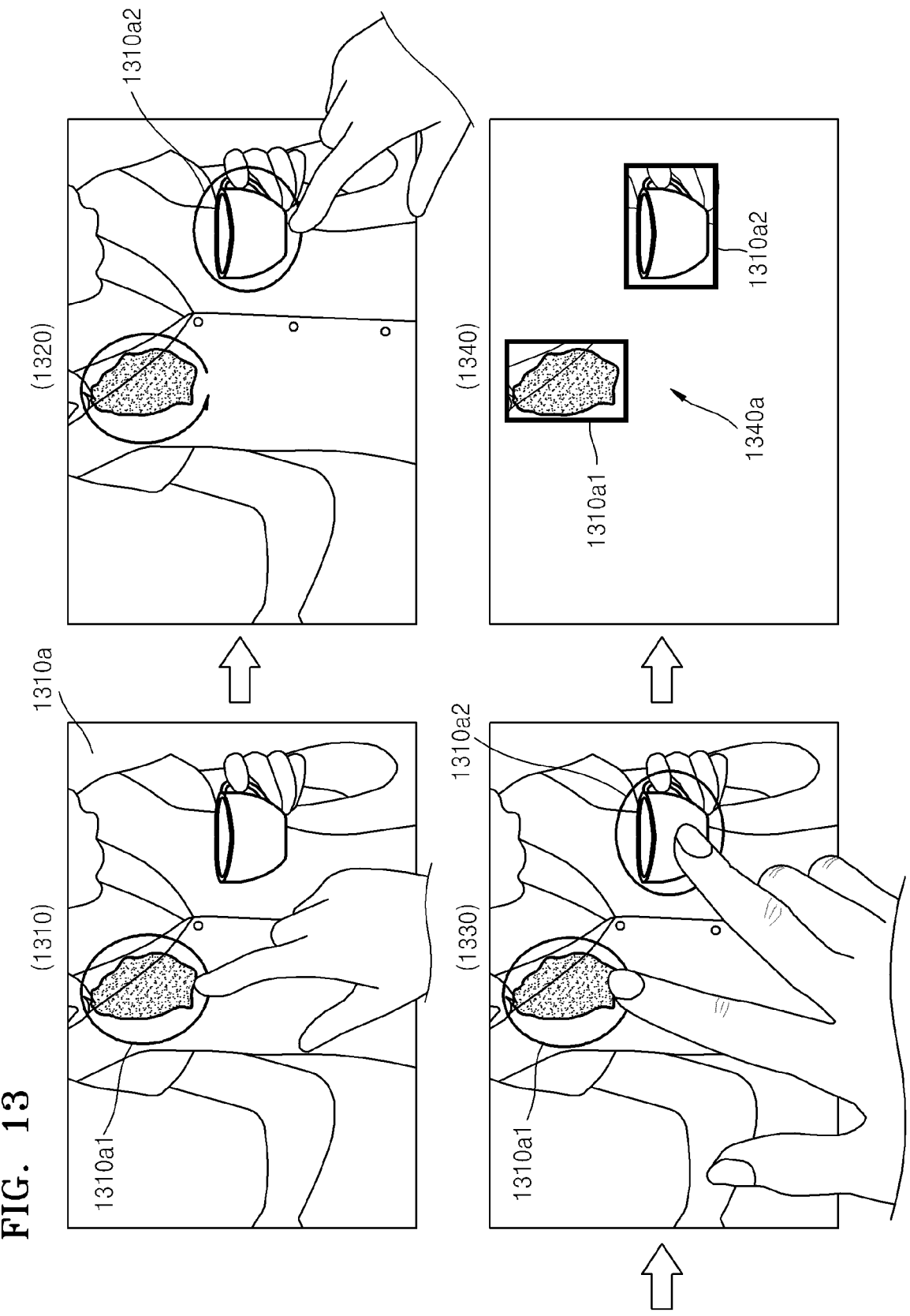

FIGS. 11 through 13 illustrate screen examples of displaying the result information obtained by recognizing the first input of FIG. 10 on the touch screen 103. That is, in FIG. 11, result information obtained by recognizing a plurality of objects 1110a1 and 1110a2 selected from an image 1110a according to a long touch of the selected objects 1110a1 and 1110a2 is displayed in squared closed regions 1120b1 and 1120b2. The squared closed regions 1120b1 and 1120b2 may be generated by using an outline detection method after the first input is recognized and displayed on the touch screen 103 as shown in a screen 1120.

In FIG. 12, if squared closed regions 1220b1 and 1220b2 are generated by detecting the outline of selected objects 1210a1 and 1210a2 of an image 1210a, the generated closed regions 1220b1 and 1220b2 are cut out, and the cut out regions 1220b1 and 1220b2 are displayed in a multi screen form. Referring to FIG. 12, a display size of the cut out regions 1220b1 and 1220b2 may be the same as an original display size. However, the two cut out regions 1220b1 and 1220b2 may be fully displayed by enlarging the display size or may be partially displayed on a screen 1220 by reducing the display size. The sizes of the cut out regions 1220b1 and 1220b2 may be different from each other according to a search relationship between the selected object.

In operation S1003, the processor 110 recognizes the second input indicating a search relationship between the plurality of objects like operation S202 of FIG. 2. Thus, in operation S1004, the processor 110 displays the result information obtained by recognizing the second input on the touch screen 103.

The result information obtained by recognizing the second input may be displayed on the touch screen 103 as an arrow indicating a direction of moving the touch point shown to help understanding in FIGS. 4 through 6 or may be displayed in an image based multi screen form.

Referring to FIG. 13, objects 1310a1 and 1310a2 are independently selected from an image 1310a displayed on the touch screen 103 (screens 1310 and 1320). In the screens 1310 and 1320, recognition results of the selected objects 1310a1 and 1310a2 are selected concurrently with displaying of selected patterns (circles) on the touch screen 103. However, the recognition results of the selected objects 1310a1 and 1310a2 may not be displayed on the touch screen 103.

In a screen 1330 of FIG. 13, if a second input indicating a search relationship between the selected objects 1310a1 and 1310a2 is input, the processor 110 may display a multi screen 1340a based on images 1340a1, 1340a2 cut out from the selected objects 1310a1 and 1310a2 as illustrated in a screen 1340. However, the present general inventive concept is not limited thereto.

In operation S1005, the processor 110 searches for information based on the first input and the second input like operation S203 of FIG. 2. In operation 1006, the processor 110 outputs the found information on the touch screen 103 of the device 100 like operation S204 of FIG. 2.

The image based information search method of FIG. 10 may be modified to display only the result information obtained by recognizing the first input or only the result information obtained by recognizing the second input on the touch screen 103.

Figure 14:
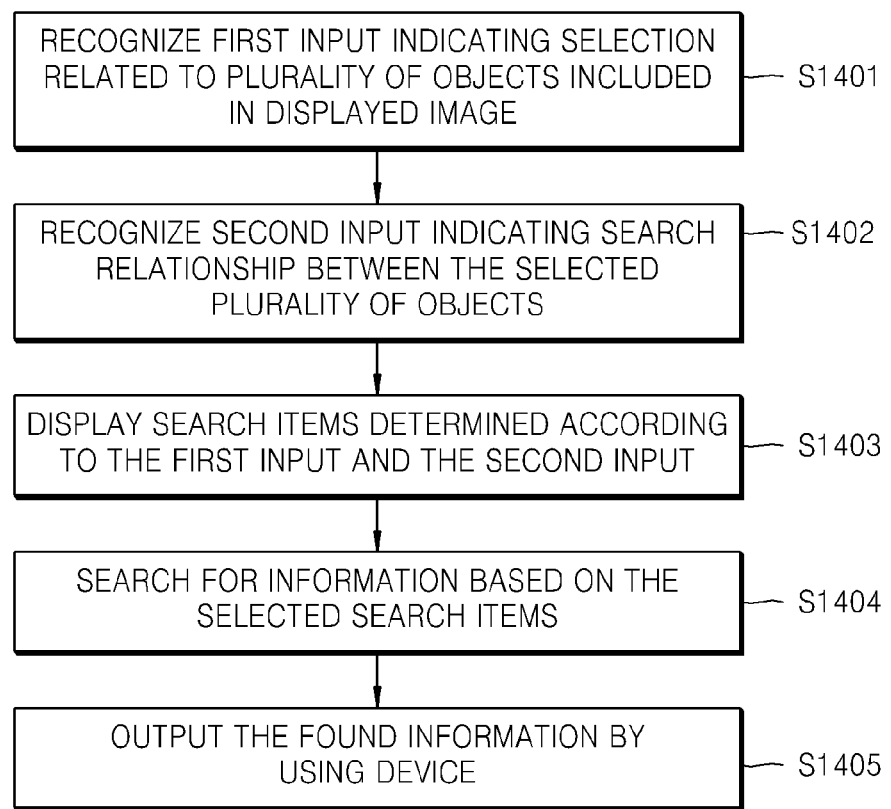
FIG. 14 is a flowchart illustrating an image based information search method according to an embodiment of the present general inventive concept.

FIG. 14 is a flowchart illustrating an image based information search method according to another embodiment of the present general inventive concept. The image based information search method of FIG. 14 further includes a function of displaying at least one search item determined according to a first input and a second input and searching for information based on a search item selected from the displayed search item, compared to the image based information search method of FIG. 2. Thus, operations S1401, S1402, S1404, and S1405 of FIG. 14 are performed in the same manner as operations S201 through S204 of FIG. 2 and thus detailed descriptions thereof will be omitted here.

In operation 1403, the processor 110 displays search items determined according to a first input and a second input. For example, in a case where the first input and the second input are input as shown in the screen 610 of FIG. 6, the processor 110 may search for information regarding an "arbitrary person having the same bag" by using the above-described search equation and determine and display classified search items based on the search equation. For example, the processor 110 may determine region information as a search item based on the above-described search equation. That is, the processor 110 may determine and display "1. Seoul, 2. Busan, 3. Kwangju, 4. Korea, and 5. USA" as search items.

Figure 15:
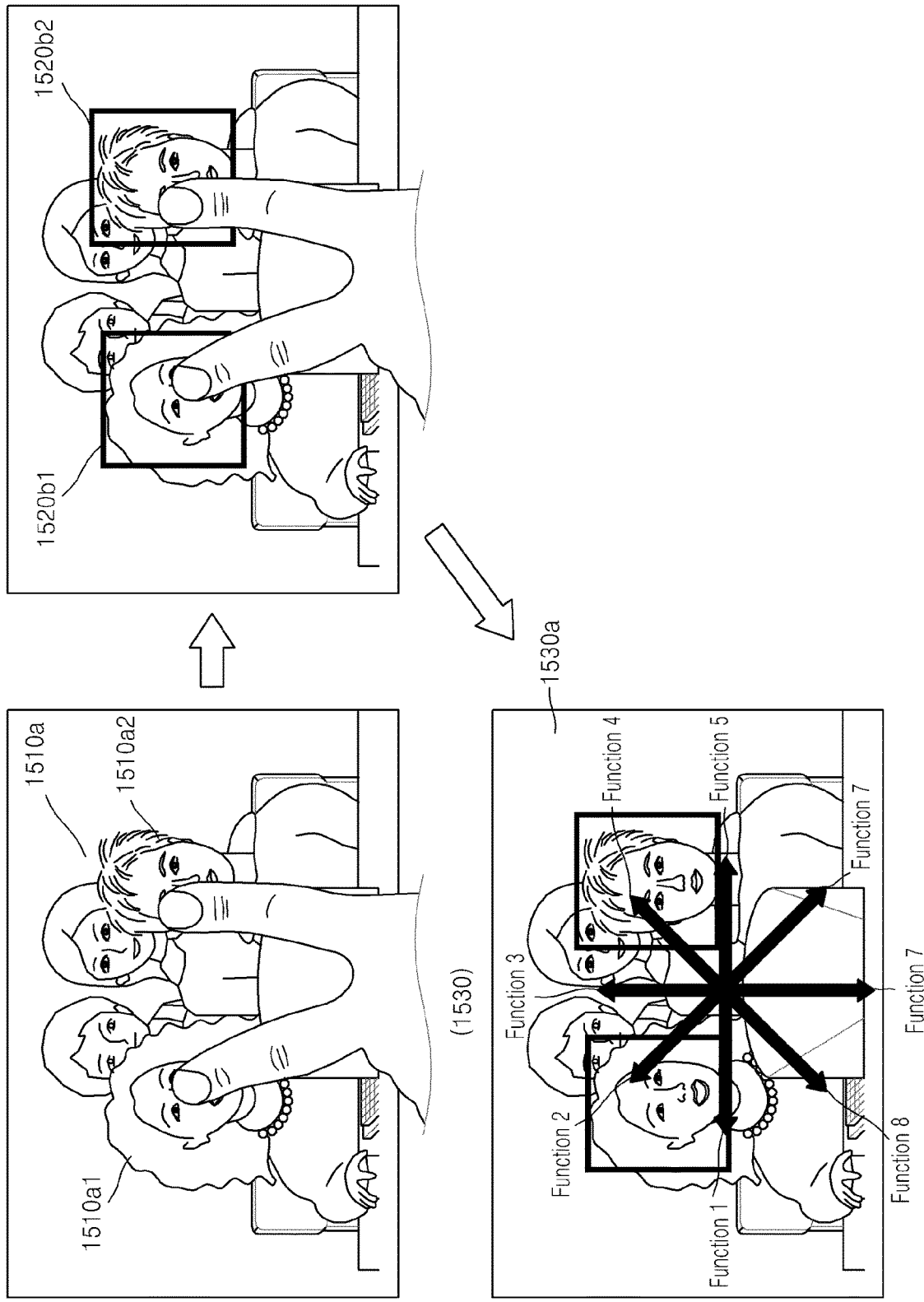
FIG. 15 illustrates screen examples displayed according to the flowchart of FIG. 14.

FIG. 15 illustrates screen examples to correspond to an operation 1403 of FIG. 14. That is, in a case where a first input of selecting a plurality of objects 1510a1 and 1510a2 is input as illustrated in an image 1510a of a screen 1510, and a second input of setting a search relationship between the selected objects 1520b1 and 1520b2 as a same layer relationship is input as illustrated in a screen 1520 (for example, a user gesture of gathering the selected objects to one point), search item information, for example, "Function 1, Function 2, Function 3, Function 4, Function 5, Function 6, Function 7, Function 8," may be determined according to the first input and the second input and displayed as illustrated in an image 1530a of a screen 1530.

The above-described search item information of FIG. 15 may include, for example, a search for service information used by two selected persons, a search for photos and moving images including the two persons, a search for photos and moving images commonly recommended by the two persons, a search for devices recently used by the two persons, a search for devices most frequently used by the two persons, a search for devices commonly recommended by the two persons, etc., but is not limited thereto.

When the search item information is displayed as shown in the screen 1530, if one of the search item information is selected, the processor 110 may search for information based on the selected search item information.

The screen 1530 is an example of displaying eight pieces of search item information as illustrated in a screen 1610 of FIG. 16. However, as illustrated in a screen 1620 and 1630 of FIG. 16, one or more search information, for example, four pieces of search item information, may be displayed as search items provided according to the first input and the second input. However, the present general inventive concept is not limited thereto. The number of provided search item information may be variable or previously set.

Figure 17:
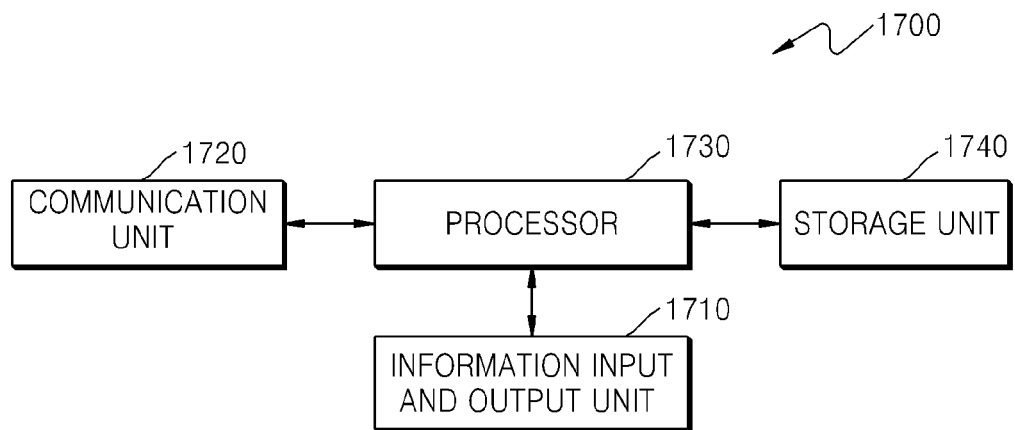
FIG. 17 is a block diagram illustrating a device according to an embodiment of the present general inventive concept.

FIG. 17 is a block diagram illustrating a device 1700 according to an embodiment of the present general inventive concept. The device 1700 of FIG. 17 may be different from the device 100 of FIG. 1.

Referring to FIG. 17, the device 1700 includes an information input and output unit 1710, a communication unit 1720, a processor 1730, and a storage unit 1740, but the present general inventive concept is not limited thereto. That is, the device 1700 may include more or less elements than the elements of FIG. 17 like the device 100 of FIG. 1 according to a design or user preference.

In a case where the device 1700 includes a number of elements less than a number of the elements of FIG. 17, the device 1700 may not include the communication unit 1720 or the storage unit 1740. In a case where the device 1700 does not include the communication unit 1720, an information search according to an image based information search method concerns information stored in the storage unit 1740, and the information stored in the storage unit 1740 is input from the information input and output unit 1710. In a case where the device 1700 does not include the storage unit 1740, the device 1700 searches for information from the above-described external device through the communication unit 1720.

The information input and output unit 1710 receives a user input and outputs output information of the device 1700. For example, the user input may include the above-described touch based input, physical button control based input, user gesture based input, user voice recognition based input, face recognition based input, and remote controller (not illustrated) based input, but the present general inventive concept is not limited thereto.

The information input and output unit 1710 according to an embodiment of the present invention may receive a first input and a second input, output result information obtained by receiving the first input and the second input, and output information searched for according to the first input and the second input.

The information input and output unit 1710 may include a dial, a slider switch, a joystick, a clock wheel, a touch pad, a touch screen, a micro phone, a speaker, sensors, a connector, a display light, a key pad, a display device, a scroll wheel, and a remote control signal receiving unit based on wireless communication, but the present general inventive concept is not limited thereto.

The communication unit 1720 may communicate with an external device over a network. The communication unit 1720 may search for information stored in the external device and provide a communication service such as a messenger service, a message service, an e-mail service, a video conference service, and a voice call service with the external device over the network but is not limited thereto. The communication unit 1720 may be configured to include at least one of the wireless communication unit 108 and the wired communication unit 109.

The processor 1730 executes at least one program for performing the image based information search method according to an embodiment of the present invention stored in the storage unit 1740. That is, the processor 1730 executes the program, recognizes receiving of the first input and the second input based on an image displayed on the information input and output unit 1710, searches for information in the storage unit 1740 according to results of the recognition, and outputs the found information to the information input and output unit 1710.

The storage unit 1740 stores the above-described at least one program and at least one communication application for commutation with the device 1700 but is not limited thereto. The storage unit 1740 may include at least one storage medium selected from the group consisting of flash memory, hard disk type memory, multimedia card micro type memory, card type memory (for example, SD memory, XD memory, or the like), ROM, EEPROM, PROM, magnetic memory, and an optical disk.

The processor 1730 may perform operations based on the methods of FIGS. 2, 10, and 14 like the processor 110 of FIG. 1A.

Figure 18:
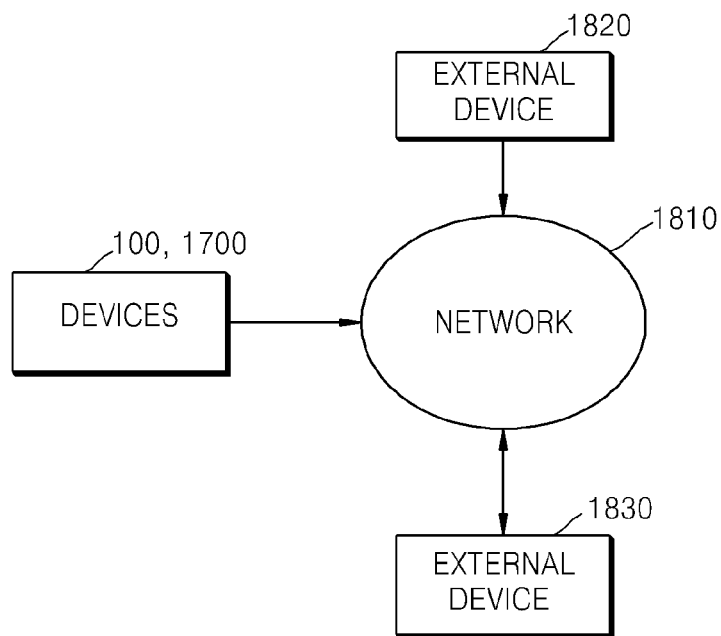
FIG. 18 is block diagram illustrating a network to connect the devices of FIGS. 1 and 17.

FIG. 18 is block diagram illustrating a network structure based on the devices 100 and 1700 of FIGS. 1 and 17. The network structure of FIG. 18 includes the devices 100 and 1700, a plurality of external devices 1820 and 1830, and the network 1810.

The plurality of external devices 1820 and 1830 may include at least one of a server and the devices 100 and 1700. The plurality of external devices 1820 and 1830 of FIG. 18 includes the external devices mentioned in the above-described embodiments. Thus, when the devices 100 and 1700 search for information, information stored in the plurality of external devices 1820 and 1830 may be searched for. The network 1810 may be configured as a network that transmits and receives data by using at least one of the wireless communication unit 108 and the wired communication unit 109 of FIG. 1A.

The plurality of objects mentioned in the above-described image based information search method may be referred to as multi objects. The above-described image based information search method may be applied to an image based service providing method.

Figure 19:
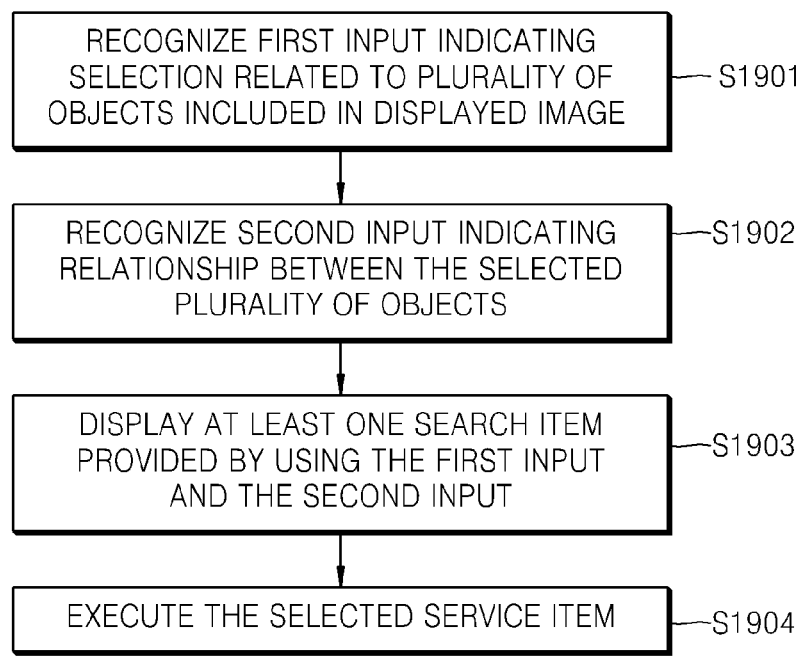
FIG. 19 is a flowchart illustrating a service providing method according to an embodiment of the present general inventive concept.

FIG. 19 is a flowchart illustrating a service providing method according to an embodiment of the present general inventive concept. The service providing method of FIG. 19 may be performed by the processor 110 of FIG. 1A or the processor 1730 of FIG. 17. However, in the present embodiment, the service providing method is performed by the processor 110 for convenience of description.

In operation S1901, the processor 110 recognizes a first input indicating a selection related to a plurality of objects included in an image displayed on the touch screen 103. The image displayed on the touch screen 103 may be a still image or a photo reproduced in the device 100 or a temporally still image of a moving image or an input image obtained by the camera 104. This definition related to the image displayed on the touch screen 103 may also be applied to the above-described embodiments.

In operation S1902, the processor 110 recognizes a second input indicating a relationship between the selected objects. The relationship between the selected objects includes the same layer relationship and the high-low layer relationship mentioned in the above-described embodiments.

In operation S1903, the processor 110 determines at least one service item provided by using the first input and the second input and displays the service item on the touch screen 103. The service item may be displayed as illustrated in the screens 1610, 1620, and 1630 of FIG. 16.

However, the determined service item may not be displayed as illustrated in the screens 1610, 1620, and 1630 of FIG. 16 and GUI information including clouds (cloud services) including a single service item may be provided. The service item may be similar to the service item described with reference to FIG. 15 and may further include most frequently used application information, recommendation application information, etc. according to an application provided by the device 100 or the external devices 1820 and 1830 and a selection between the selected objects, but is not limited thereto.

That is, in a case where the relationship between the selected objects is the same layer relationship, the service item may include service items that may be provided to each of the selected objects, and, in a case where the relationship between the selected objects is the high-low layer relationship, the service item may include service items that may be provided according to high-low layer relationships between the selected objects, but is not limited thereto.

In operation S1904, the processor 110 executes a service item selected from the service item displayed on the touch screen 103.

The image based information search method or the service providing method according to embodiments of the present invention may also be embodied as computer readable codes on a computer readable recording medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. However, the present general inventive concept is not limited thereto. The computer readable medium may be distributed among computer systems that are interconnected through a network, and the present invention may be stored and implemented as computer readable code in the distributed system.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An information search method based on an image displayed on a device, the method comprising:
   receiving, by a processor of the device, a first input indicating a selection related to a plurality of objects included in the image;
   receiving, by the processor, a second input indicating a search relationship between the selected plurality of objects, the search relationship between the selected plurality of objects comprises one of a same layer relationship indicating that the selected plurality of objects have been allocated equal priority in a search and a parent-child layer relationship indicating that the selected plurality of objects have been allocated different priorities in the search;
   searching for, by the processor, information based on the first input and the second input; and
   outputting, by the processor, found information through the device.

2. The information search method of claim 1, wherein, when the search relationship between the selected plurality of objects is the same layer relationship, the second input comprises one of a touch based gesture for obtaining the selected plurality of objects and a touch based gesture for moving the selected plurality of objects to at least one display location other than display locations of the selected plurality of objects.

3. The information search method of claim 1, wherein, when the search relationship between the selected plurality of objects is the parent-child layer relationship, the second input comprises one of a touch based gesture indicating moving one or more selected objects excluding one object among the selected plurality of objects to a display location of the excluded one object and a touch based gesture indicating moving at least one of the selected plurality of objects to a display location of one of the selected plurality of objects.

4. The information search method of claim 1, wherein:
   when the search relationship between the selected plurality of objects is the same layer relationship, the searching for the information comprises:
      displaying information used to select one of an information search item comprising at least one of the selected plurality of objects and an information search item comprising all of the selected plurality of objects, and
      searching for the information according to the information search item selected based on the displayed information.

5. The information search method of claim 1, wherein:
   when the search relationship between the selected plurality of objects is the parent-child layer relationship, the searching for the information comprises:
      determining a search condition based on the parent-child layer relationship between the selected plurality of objects, and
      searching for the information according to the determined search condition.

6. The information search method of claim 1, further comprising:

requesting, by the processor, an external device to search for the information based on the first input and the second input, and receiving, by the processor, a search result from the external device.

7. The information search method of claim 1, further comprising:

displaying, by the processor, information indicating receiving related to the first input on a display of the device.

8. The information search method of claim 7, wherein the information indicating the receiving related to the first input by the device comprises one of information indicating closed regions based on outlines of the plurality of objects or each object, information based on a cut image based on the outlines of the plurality of objects or the each object, and a multi-screen based on the cut image.

9. The information search method of claim 1, further comprising:

displaying, by the processor, information indicating receiving related to the second input on a display of the device.

10. A device comprising:

a storage storing at least one piece of information and at least one program;

a touch screen displaying an image;

a processor configured:

to provide a user interface based on the touch screen, to receive a first input indicating a selection related to a plurality of objects included in the image and receive a second input indicating a search relationship between the selected plurality of objects, the search relationship between the selected plurality of objects comprises one of a same layer relationship indicating that the selected plurality of objects have been allocated equal priority in a search and a parent-child layer relationship indicating that the selected plurality of objects have been allocated different priorities in the search, to search for the information based on the first input and the second input, and to output found information on the touch screen.

11. The device of 10, wherein, when the search relationship between the selected plurality of objects is the same layer relationship, the second input comprises one of a touch based gesture indicating obtaining the selected plurality of objects and a touch based gesture indicating moving the selected plurality of objects to at least one display location other than display locations of the selected plurality of objects.

12. The device of claim 10, wherein, when the search relationship between the selected plurality of objects is the parent-child layer relationship, the second input comprises one of a touch based gesture indicating moving one or more selected objects excluding one object among the selected plurality of objects to a display location of the excluded one object and a touch based gesture indicating moving at least one of the selected plurality of objects to a display location of one of the selected plurality of objects.

13. The device of claim 10, wherein:

when the search relationship between the selected plurality of the objects is the same layer relationship, the processor is further configured to display information used to select an information search item comprising at least one of the selected plurality of objects and an information search item comprising all of the selected plurality of objects, and to search for the information according to the information search item selected based on the displayed information.

14. The device of claim 10, wherein:

when the search relationship between the selected plurality of objects is the parent-child layer relationship, the searching for the information comprises:

the processor is further configured to determine a search condition based on the parent-child layer relationship between the selected plurality of objects, and search for the information according to the determined search condition.

15. The device of claim 10, further comprising:

a communication interface for communication with an external device; and wherein the processor is further configured to request the external device to search for the information based on the first input and the second input through the communication interface, and receive a search result from the external device.

16. The device of claim 10, wherein the processor is further configured to display information indicating receiving related to the first input on the touch screen.

17. The device of claim 16, wherein the information indicating receiving related to the first input comprises one of information indicating closed regions based on outlines of the selected plurality of objects or each object, information based on a cut image based on the outlines of the selected plurality of objects or the each object, and a multi-screen based on the cut image.

18. The device of claim 10, wherein the processor is further configured to display information indicating receiving related to the second input on the touch screen.

19. A non-transitory computer readable recording medium storing one or more programs comprising a command language to execute the information search method of claim 1.

* * * * *

UNITED STATES PATENT AND TRADEMARK OFFICE
CERTIFICATE OF CORRECTION

PATENT NO. : 11,314,804 B2  
APPLICATION NO. : 16/802979  
DATED : April 26, 2022  
INVENTOR(S) : Sun-mi Jin et al.

Page 1 of 1

It is certified that error appears in the above-identified patent and that said Letters Patent is hereby corrected as shown below:

In the Claims

Column 23, Line 43:
In Claim 11, delete "10," and insert --claim 10,--.

Signed and Sealed this
Seventh Day of June, 2022

Katherine Kelly Vidal
*Director of the United States Patent and Trademark Office*